(12) United States Patent
Miyauchi

(10) Patent No.: US 8,429,392 B2
(45) Date of Patent: Apr. 23, 2013

(54) FUNCTION EXPANSION APPARATUS FOR CONNECTING AN INFORMATION PROCESSING APPARATUS TO AN EXTERNAL STORAGE APPARATUS

(75) Inventor: Keiji Miyauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 12/929,429

(22) Filed: Jan. 24, 2011

(65) Prior Publication Data

US 2011/0125939 A1 May 26, 2011

Related U.S. Application Data

(63) Continuation of application No. PCT/JP2008/063432, filed on Jul. 25, 2008.

(51) Int. Cl.
*G06F 9/00* (2006.01)
*G06F 9/24* (2006.01)
*G06F 15/177* (2006.01)
*G06F 11/00* (2006.01)

(52) U.S. Cl.
USPC ............... 713/2; 713/1; 713/100; 714/6.1; 714/15

(58) Field of Classification Search .................. None
See application file for complete search history.

(56) References Cited

U.S. PATENT DOCUMENTS

| | | | |
|---|---|---|---|
| 6,851,022 B2* | 2/2005 | Ikeuchi et al. ............. | 711/114 |
| 6,874,100 B2* | 3/2005 | Rauscher .................. | 714/6.21 |
| 7,310,704 B1* | 12/2007 | Wen et al. ................. | 711/114 |
| 7,321,927 B2 | 1/2008 | Nakajima et al. | |
| 7,444,502 B2 | 10/2008 | Hatasaki et al. | |
| 7,551,850 B2* | 6/2009 | Alana et al. .............. | 398/2 |
| 7,631,219 B2* | 12/2009 | Franklin et al. .......... | 714/6.32 |
| 2001/0052069 A1 | 12/2001 | Sekiguchi | |
| 2002/0194528 A1* | 12/2002 | Hart ......................... | 714/6 |

(Continued)

FOREIGN PATENT DOCUMENTS

| | | |
|---|---|---|
| JP | 2001-356913 | 12/2001 |
| JP | 2002-099390 | 4/2002 |
| JP | 2004-252977 | 9/2004 |
| JP | 2007-066216 | 3/2007 |
| JP | 2007-164305 | 6/2007 |

OTHER PUBLICATIONS

Fujitsu Limited, "SAN Boot improves availability, manageability and maintainability", Dec. 18, 2006, 2 Pages (http://primeserver.fujitsu.com/sparcenterprise/technology/virtual/sanboot/).

(Continued)

*Primary Examiner* — Ji H. Bae
(74) *Attorney, Agent, or Firm* — Staas & Halsey LLP

(57) ABSTRACT

A disclosed function expansion apparatus for expanding a function of an information processing apparatus by connecting the information processing apparatus to an external storage apparatus via a first interface includes a first storage unit that stores first setup information used for connecting the information processing apparatus to the external storage apparatus, a connection module unit that is operated based on the first setup information and connects the information processing apparatus to the external storage apparatus via the first interface, a control unit that is connected to the first storage unit, and the connection module unit or a second storage unit, and stores second setup information stored in the second storage unit into the first storage unit, wherein the second storage unit is exchangeable with the connection module unit and stores the second setup information in connecting to the connection module unit.

5 Claims, 29 Drawing Sheets

U.S. PATENT DOCUMENTS

2004/0162956 A1 8/2004 Hidai et al.
2009/0077312 A1* 3/2009 Miura ............................ 711/113
2011/0125939 A1* 5/2011 Miyauchi ...................... 710/104

OTHER PUBLICATIONS

Fujitsu Limited, "High-speed backup and restoration in SAN Boot environment", Dec. 18, 2006, 4 Pages (http://storage-system.fujitsu.com/jp/event/smw2006/exhibition4/).

Fujitsu Limited, "SPARC Enterprise—ETERNUS SAN Boot Environment Build Guide-Solaris™ Operating System-" Version 1.4, Jan. 2010, pp. 1-81 (http://primeserver.fujitsu.com/unix/download/driver/pfca-4/pdf/sesanboot-ja.pdf).

International Search Report for PCT/JP2008/063432, mailed Oct. 28, 2008.

* cited by examiner

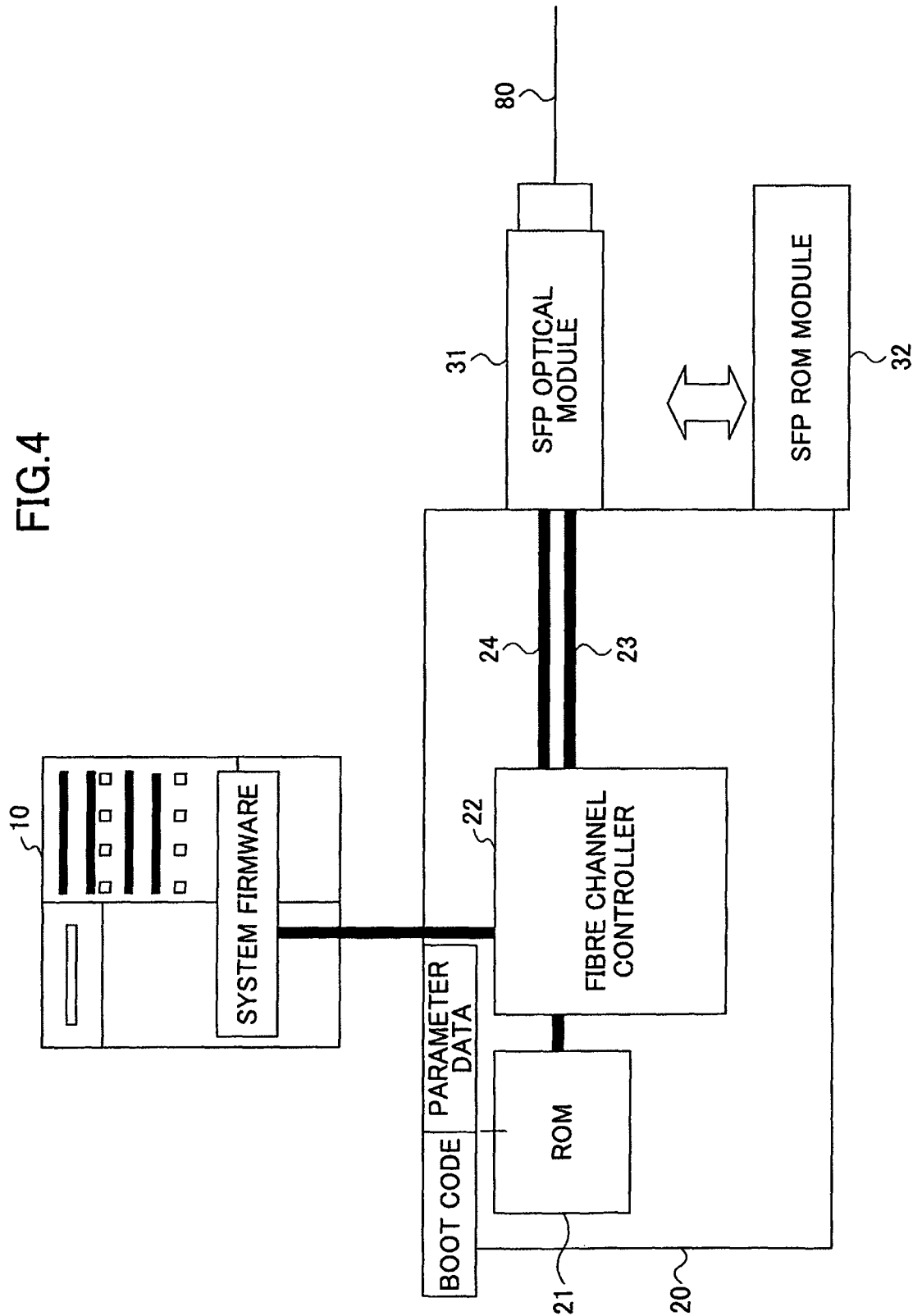

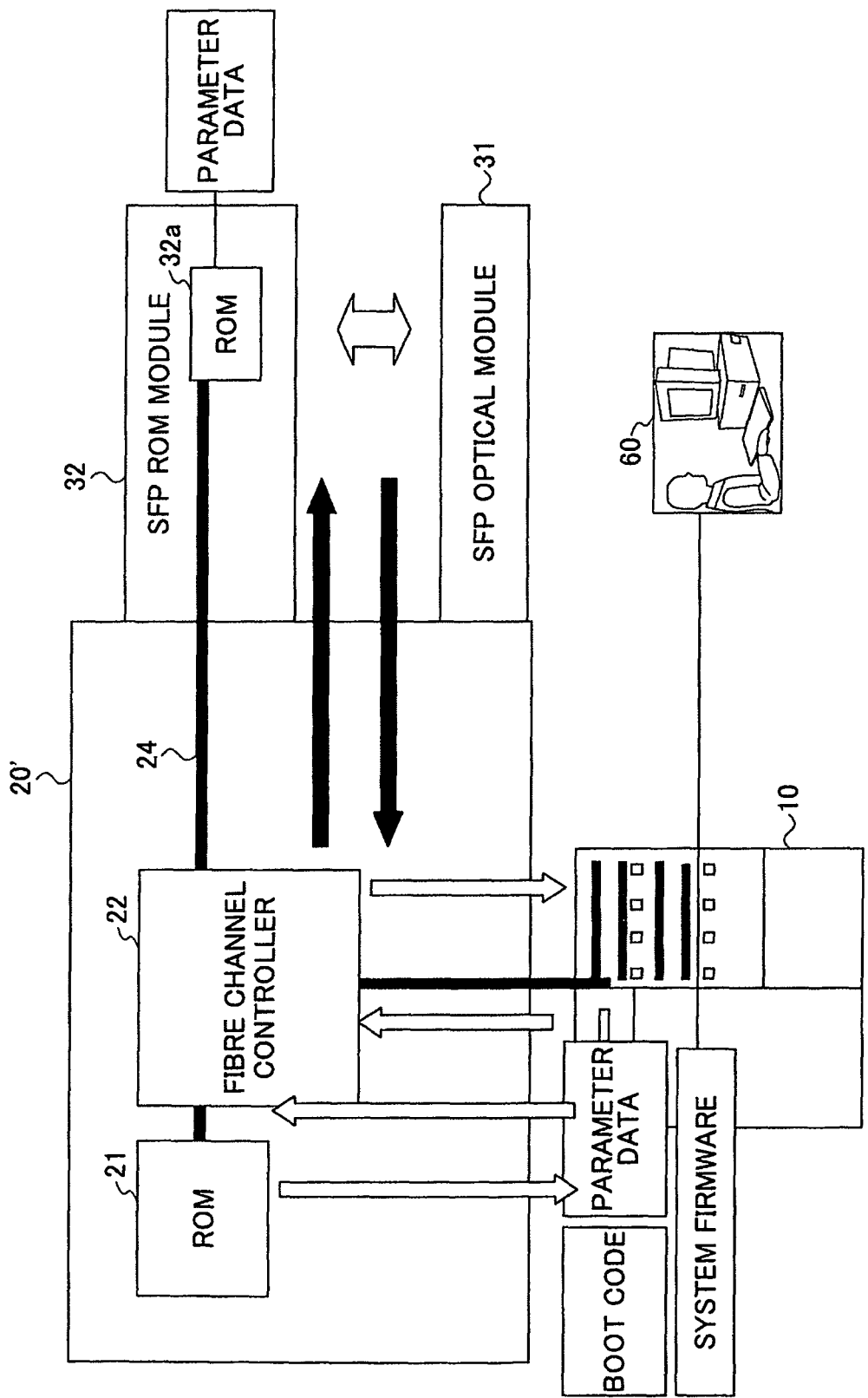

FUNCTION EXPANSION APPARATUS FOR CONNECTING AN INFORMATION PROCESSING APPARATUS TO AN EXTERNAL STORAGE APPARATUS

CROSS-REFERENCE TO RELATED APPLICATIONS

This application is a U.S. continuation application filed under 35 USC 111a and 365c of PCT application JP2008/063432, filed Jul. 25, 2008. The foregoing application is hereby incorporated herein by reference.

FIELD

A certain aspect of the embodiments discussed herein is related to a function expansion apparatus, an information processing apparatus, and a control method.

BACKGROUND

In recent days, there is an increasing demand for constructing a system running an OS with a RAID apparatus in an SAN environment using a fibre channel card in a server, along with trends toward diskless servers and disaster recovery for the servers. In this specification, SAN stands for Storage Area Network, RAID stands for Redundant Arrays of Independent Disks, and OS stands for Operating System.

An SAN boot under the SAN environment is described next. The SAN boot is a function of running (hereinafter, also referred to as booting) the OS on a server with a RAID apparatus connected to the server via a fibre channel not with a built-in disk of the server. The fibre channel card in a system environment having a function of the SAN boot has a boot code for enabling an OS boot from a RAID apparatus connected to the fibre channel card. In this case, in order to enable the OS boot from the RAID apparatus in the server, an operator previously stores information related to the RAID apparatus to be connected using the boot code and the boot code in the fibre channel card using firmware. The information related to the RAID apparatus is, for example, a World Wide Name (WWN) of the RAID apparatus, and Target ID information, topology information, and Link Speed information of the disk of the RAID apparatus.

In the specification, the boot code is a program for reading OS data from a storage device such as a RAID apparatus connected to an outside of the server and booting the server. In the specification, a driver is a program for controlling the fibre channel card operated on the server. Further, the fibre channel is one of data transfer methods for connecting a computer and a peripheral device. The fibre channel is used to transfer a serial Small Computer System Interface (SCSI) protocol. Link Speed designates a transfer speed of the fibre channel. PCI-Express designates a bus of the server used to connect an interface card for a connection with the peripheral device. RAID designates a device for controlling plural disks and providing a storage resource. SAN designates a network for connecting a storage device such as a RAID or tape library. Topology designates a connection mode of a fibre channel such as AL_PA loop connection and an N_Port switch connection.

WWN designates a unique address code of 8 bytes used in fibre channel communication, and is given to an apparatus connected to the fibre channel. A system monitoring mechanism designates a system for monitoring and controlling the server. The built-in disk is a basic disk for storing OS data in the server. Target ID is a logical ID for identifying the disk.

These are disclosed in Japanese Laid-open Patent Publication No. 2007-66216, and Japanese Laid-open Patent Publication No. 2007-164305.

SUMMARY

According to an aspect of the embodiment, a function expansion apparatus for expanding a function of an information processing apparatus by connecting the information processing apparatus to an external storage apparatus via a first interface includes a first storage unit that stores first setup information used for connecting the information processing apparatus to the external storage apparatus, a connection module unit that is operated based on the first setup information and connects the information processing apparatus to the external storage apparatus via the first interface, a control unit that is connected to the first storage unit, and the connection module unit or a second storage unit, and stores second setup information stored in the second storage unit into the first storage unit, wherein the second storage unit is exchangeable with the connection module unit and that stores the second setup information in connecting to the connection module unit.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 4 is a block chart for illustrating a structure of a fibre channel card of Embodiment 1;

FIG. 5B is a second block chart for illustrating a function and effect of a fibre channel card of Embodiment 1;

DESCRIPTION OF EMBODIMENT(S)

Preferred embodiments of the present invention will be explained with reference to accompanying drawings. Hereinafter, reference symbols typically designate as follows:

10: Server;
20, 20': Fibre channel card;
21: ROM;
22: Fibre channel controller;
31: Optical module optical module;
31a: ROM;
32: ROM module;
32a: ROM;
60: Administrating terminal;
100: RAID apparatus; and
200: Fibre channel switch.

In a system of carrying out an SAN boot with the RAID apparatus connected to the fibre channel card of the Embodiment, a ROM (Read Only Memory) module exchanged by an SFP optical module (hereinafter, simply referred to as an optical module) is used. In the specification, the SFP stands for a small form factor pluggable (namely, detachable), and the ROM stands for a read only memory. Parameter data for the SAN boot stored in the ROM of the fiber channel card are stored in the ROM module. As a result, the parameter data can be automatically restored after replacing the faulty fiber channel card.

According to another Embodiment, in a system of carrying out the SAN boot with the RAID apparatus connected to the fibre channel card, the system firmware of the server and a known I2C (Inter-Integrated Circuit) bus are used. In this, the I2C bus used along with a Peripheral Component Interconnect (hereinafter, referred to as PCI) bus or a PCI-Express bus. The parameter data for the SAN boot in the ROM of the fiber channel card are stored in the server using the I2C bus, and the parameter data after replacing the fault fibre channel card are restored with a total automation.

Further, according to another Embodiment, in a system of carrying out an SAN boot with the RAID apparatus connected to the fibre channel card, a ROM built into an optical module of the fibre channel card is used. The parameter data for the SAN boot in the ROM of the fiber channel card are stored in the server using the I2C bus, and the parameter data after replacing the fault fibre channel card are restored with total automation.

Further, according to another Embodiment, by using a detection signal of an optical module, the parameter data for the SAN boot stored in the ROM of the fibre channel card are automatically stored, and an instruction for carrying out restoration of the parameter data after the fault fibre channel card is exchanged is automatically generated.

Further, according to another Embodiment, parameter data of all fibre channel cards in a system are stored in a ROM of one fiber channel card. As a result, it becomes possible to automatically restore the parameter data of plural channel cards by restoring only the one fibre channel card.

Through the specification, the ROM designates a known FLASH-ROM, EEPROM (Electrically Erasable Programmable Read-Only Memory), or the like providing reading, writing or deleting of data.

Hereinafter, the Embodiments are described in detail with reference to the figures.

Figure 1:
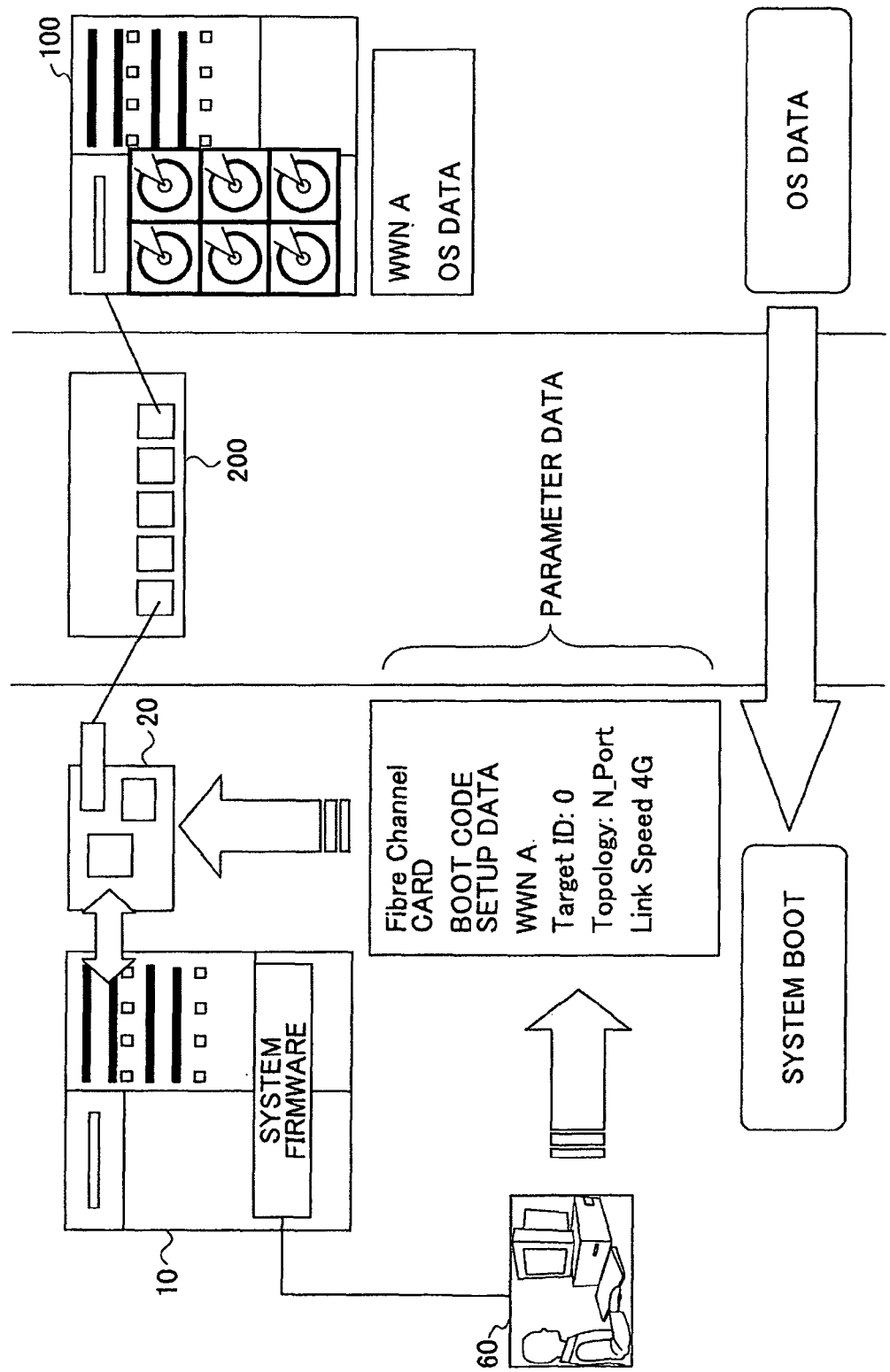
FIG. 1 is a block chart for explaining a structure of an overall system of an Embodiment.

FIG. 1 is a block chart for explaining a structure of an information processing system of the Embodiments. The information processing system has an SAN environment using the fibre channel as an interface. A server 10 is connected to a RAID apparatus 100 via a fibre channel switch 200. The server 10 has a fibre channel card 20 having a structure for connecting to the fiber channel switch 200.

The information processing system has a function of the SAN boot. The fibre channel card 20 has a boot code for enabling the OS boot with the RAID apparatus 100. Information related to the RAID apparatus 100 (hereinafter, referred to as "setup information for SAN boot") to be connected from the server 10 using a boot code is previously stored in the fibre channel card 20 along with the boot code. This storage may be carried out by an operator using firmware of the server. The setup information for the SAN boot may include a World Wide Name (WWN) of the RAID apparatus, and Target ID information, topology information, Link Speed information or the like of disks of the RAID apparatus. The WWN is information being peculiar to and identifying the RAID apparatus. The Target ID information is provided to respectively identifying drive devices of the RAID apparatus. The topology information indicates connection modes of the fiber channels as an interface. The Link Speed information indicates speed information of the fibre channel as an interface.

Figure 2:
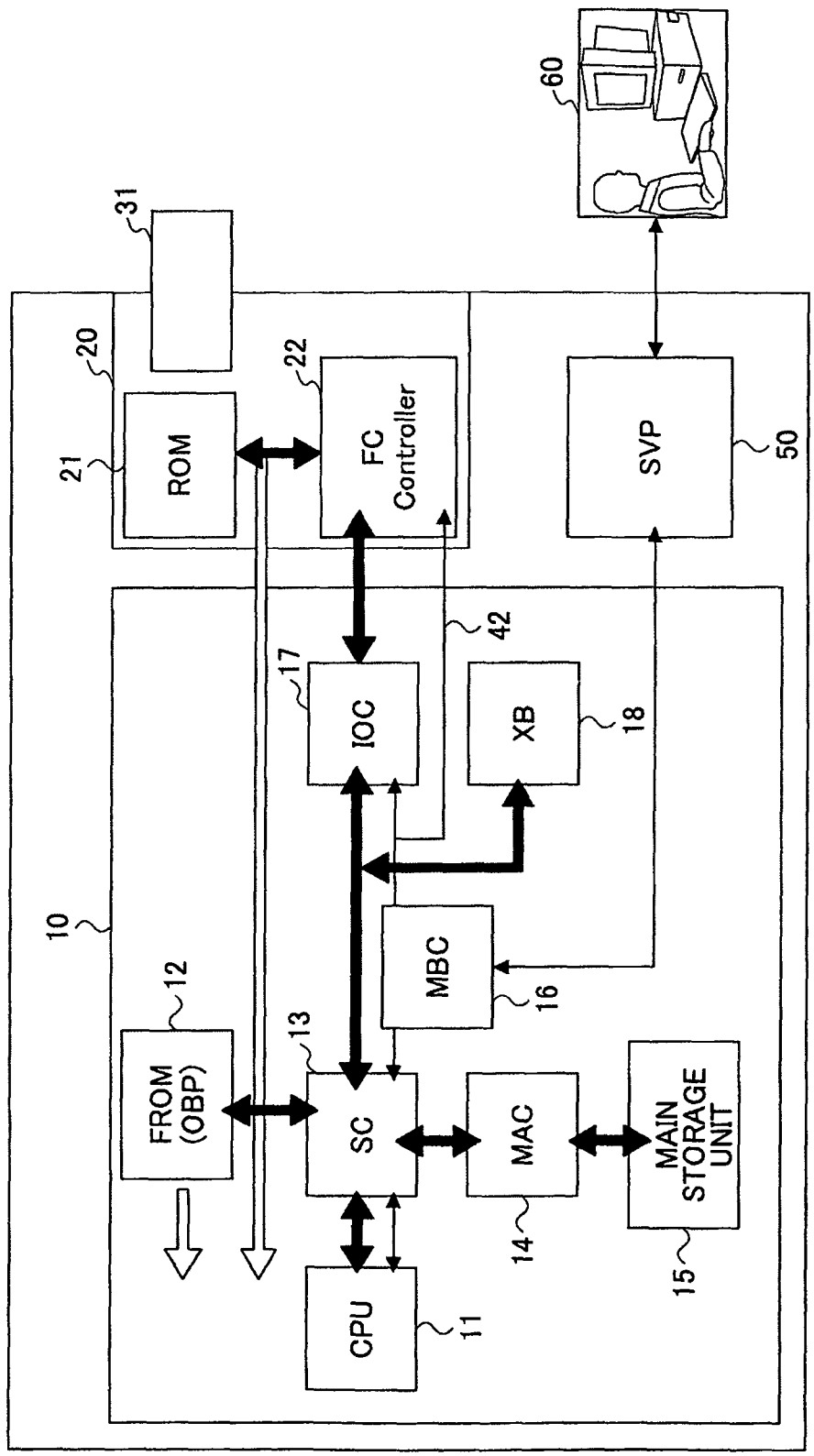
FIG. 2 is a block chart for explaining an inner structure of the server illustrated in FIG. 1.

FIG. 2 is a block chart illustrating an inner structure of the server 10.

The server 10 illustrated in FIG. 2 includes a CPU 11, a FROM 12, a system controller 13, a memory access controller 14, a main storage unit 15, a monitoring bus controller 16, an I/O controller 17, and a cross bus switch 18. Through the specification, the FROM designates a flash ROM.

The system controller 13 controls communications among the CPU 11, various controllers 14, 16, and 17, the memory (FROM) 12, and the like. An OBP (Open Boot Programmable ROM), hereinafter referred to as a system firmware, is installed in the FROM 12. The memory access controller 14 controls access to the main storage unit 15. The monitoring bus controller 16 provides a bus state monitoring function via a service processor 50 (hereinafter, simply referred to as a system controlling device). The I/O controller 17 provides an interface with a PCI bus.

Figure 3A:
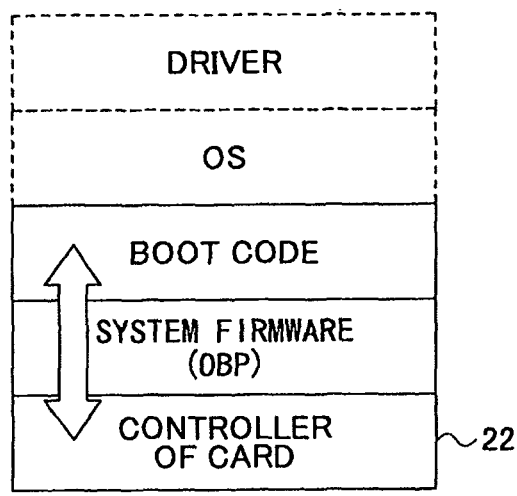
FIG. 3A is a first view for explaining a structure of a control program in a server illustrated in FIG. 2.
Figure 3B:
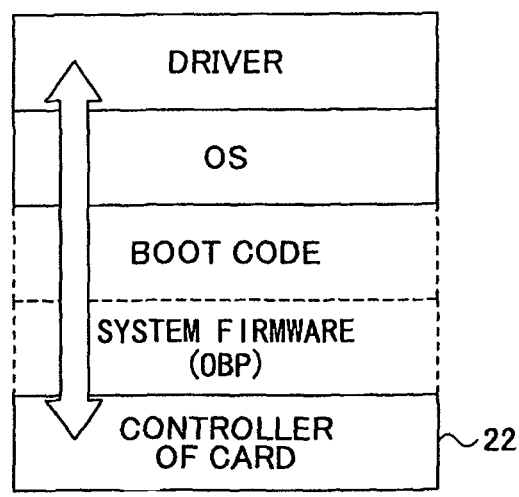
FIG. 3B is a second view for explaining a structure of the control program in the server illustrated in FIG. 2.

FIGS. 3A and 3B illustrate a flow of starting up a control program inside the server 10 and a structure of the control program. In the server 10, the CPU 11 reads a system firmware from a FROM 12 and loads the system firmware on the main storage unit 15. As illustrated in FIG. 3A, the system firmware reads a boot code from the FROM 21 (hereinafter, simply referred to as a ROM 21) in the fibre channel card 20 and loads the system firmware into the main storage unit 15. Next, the system firmware controls a controller 22 for the fibre channel card 20 based on the boot code. As a result, the server 10 accesses the RAID apparatus 100 via the fibre channel switch 200 and reads OS data from the RAID apparatus 100. The OS data are loaded into the main storage unit 15. Thereafter, the CPU 11 invokes the OS using the OS data. Thereafter, the server 10 is controlled by the invoked OS. After the OS is invoked, as illustrated in FIG. 3B, a driver operated in the OS controls the controller 22 of the fibre channel card 20. As a result, the server 10 may access the RAID apparatus 100 via the fibre channel switch 200.

Embodiment 1 is described with reference to FIG. 4 to FIG. 7.

FIG. 4 is a block chart illustrating a structure of the fibre channel card 20 related to Embodiment 1.

As illustrated in FIG. 4, the fibre channel card 20 of Embodiment 1 includes the controller (fiber channel controller) 22 and the ROM 21. The fibre channel card 20 may have a similar structure to a fibre channel card of a known technology, and a detailed explanation thereof is omitted. Therefore, setup information for the SAN boot is recorded in the ROM 21.

The fibre channel controller 22 includes an optical module 31 for connecting a fibre channel cable 80 which is connected to the fibre channel switch 200. The optical module 31 is detachable as described above and can be inserted and retracted from the fibre channel card 20. The optical module 31 has a bus 24 for I2C (hereinafter, referred to as I2C of SFP) used for confirming information related to the optical module 31 in addition to a signal bus 23 which transmits a fibre channel signal between the optical module 31 and the fibre channel controller 22. By using the system firmware of the server 10, it is possible to use a read-write command for carrying out reading out or writing in the ROM 21 via the fibre channel controller 22. By using these commands, it is possible to set up or read the parameter data in the ROM 21.

With Embodiment 1, based on the boot code stored in the ROM 21, the bus 24 of the I2C is used and the parameter data of setup information for the SAN boot are written in a built-in ROM 32a (see FIG. 5A) of an SFP ROM module 32. The system firmware of the server 10 carries out this operation using a write command of I2C for SFP. The SFP ROM module includes the built-in ROM 32a, has a structure in which the SFP ROM module 32 is exchanged by the optical module (SFP optical module), and further has the interface for the I2C. The above write operation is carried out by replacing the optical module (SFP optical module) 31 with the ROM module (SFP ROM module) 32. Both the optical module (SFP optical module) 31 and the ROM module (SFP ROM module) 32 are detachable and have a structure in which the optical module (SFP optical module) 31 and the ROM module (SFP ROM module) 32 are inserted into and detached from the fibre channel card 20. The optical module (SFP optical module) 31 and the ROM module (SFP ROM module) 32 are interchangeable relative to the fiber channel card 20.

In Embodiment 1, various parameter data such as the WWN of the RAID apparatus on a connection destination and Target ID, Link Speed, or the like of the RAID apparatus which are setup information pieces for the SAN boot stored in the ROM 21 are taken out. The taken-out parameter data are stored in the built-in ROM 32a of the SFP ROM module 32. When the stored parameter data are read, the SFP ROM module 32 is installed in the fibre channel card 20, and the system firmware uses a read command of I2C based on the boot code. With this, the parameter data are read from the built-in ROM 32a of the SFP ROM module 32 and written in the ROM 21. These operations of reading out and writing in are automatically carried out by the fibre channel controller 22 upon an instruction from the system firware.

With Embodiment 1, it is possible to store the parameter data being setup information for the SAN boot in the built-in ROM 32a of the SFP ROM module 32 and the parameter data are restored from the built-in ROM 32a to the ROM 21. Consequently, when the fibre channel card 20 fails and is exchanged by a new fibre channel card, the SFP ROM module 32 is installed in the new fibre channel card. In this state, the system firmware of the server 10 reads the parameter data from the built-in ROM 32a of the SFP ROM module 32 and writes the parameter data to the new fibre channel card. These operations of reading out and writing in are realized when the system firmware instructs the fibre channel controller 22 of the new fibre channel card. Consequently, the parameter data can be restored. With Embodiment 1 as described above, the setup information for the SAN boot is stored outside the fibre channel card 20 and the setup information can be restored in the exchanged fibre channel card. Consequently, the information existing when the fibre channel card 20 fails can be easily inherited. The inheriting operation of the information is automatically carried out when the system firmware of the server 10 instructs the fibre channel controller 22 to do so. Therefore, it is possible to effectively prevent the setup failure of the information which may be caused when the information is artificially inherited.

With Embodiment 1, the parameter data being the setup information for the SAN boot is sheltered in another place (specifically, the built-in ROM 32a of the SFP ROM module 32) via an ordinary interface, specifically the above I2C. After replacing the fibre channel card 20, by reading the sheltered parameter data from the different place, an environment can be inherited.

Figure 5A:
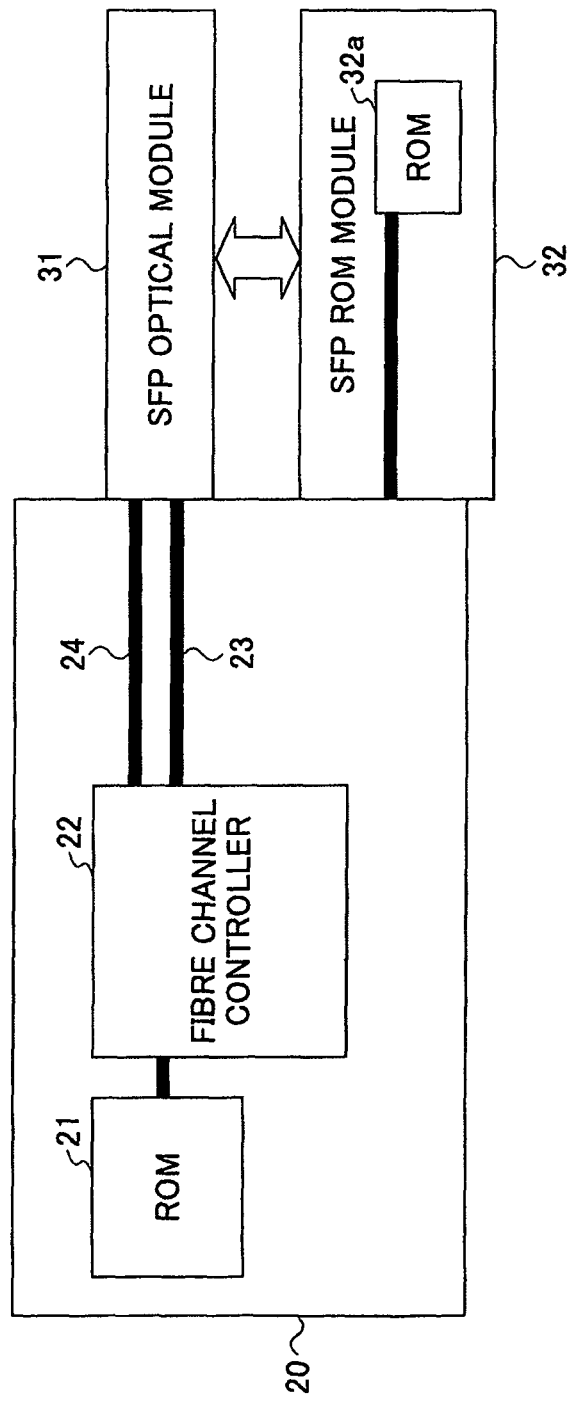
FIG. 5A is a first block chart for illustrating a function and effect of a fibre channel card of Embodiment 1.

With Embodiment 1, the SFP ROM module 32 corresponding to the I2C interface is connected to the bus (I2C interface) 24 which is separately provided for communicating the signals through the fibre channel and used for confirming the information related to the optical module 31. Specifically, as illustrated in FIG. 5A, the optical module 31 installed in the fibre channel card 20 is removed and exchanged by the SFP ROM module 32. Under this state, the parameter data in the ROM 21 are stored in the built-in ROM 32a of the connected ROM module. By using a write command of I2C, the parameter data read from the ROM 21 are written in the built-in ROM 32a of the SFP ROM module 32.

After exchanging the fibre channel card 20 for a new fibre channel card 20', the optical module (SFP optical module) 31 of the fibre channel card 20' is exchanged for the above SFP ROM module 32 (FIG. 5B). In this state, the parameter data written in the built-in ROM 32a is read from the SFP ROM module 32 by using the I2C read command. The read parameter data are written in the ROM 21 of the new fibre channel card 20'. With this operation, parameter data stored in the ROM 21 of the fibre channel card 20 before the exchange may be inherited in the new ROM 21 of the exchanged fibre channel card 20'. After completing writing the parameter data in the new ROM 21 of the exchanged fibre channel card 20', the SFP ROM module 32 is removed from the new fibre channel card 20'. The optical module 31 originally installed in the fibre channel card 20' is installed in the fibre channel card 20' back in place of the fibre channel card. Consequently, the new fibre channel card 20' uses the parameter data written in the ROM 21 and is enabled to carry out the SAN boot of the server 10 in a similar manner to the fibre channel card 20 before the exchange.

Figure 6:
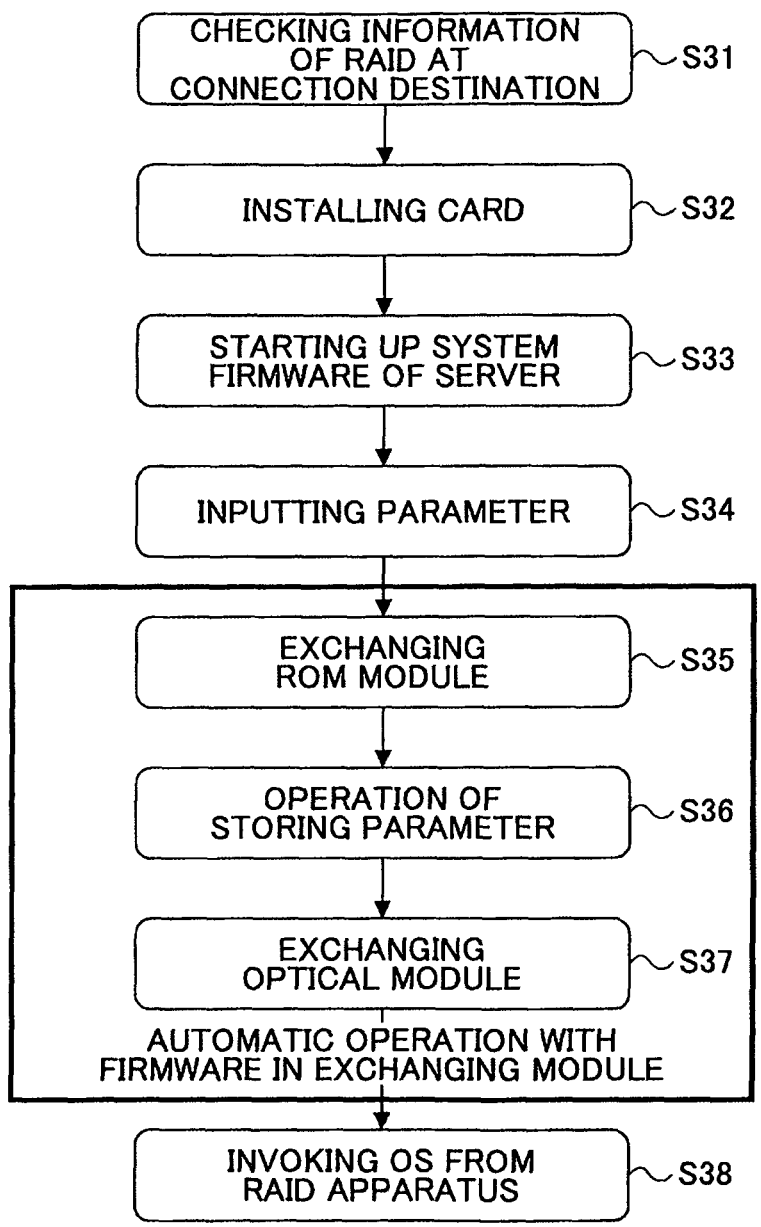
FIG. 6 is a first flow chart for illustrating a function and effect of the fibre channel card of Embodiment 1.
Figure 7:
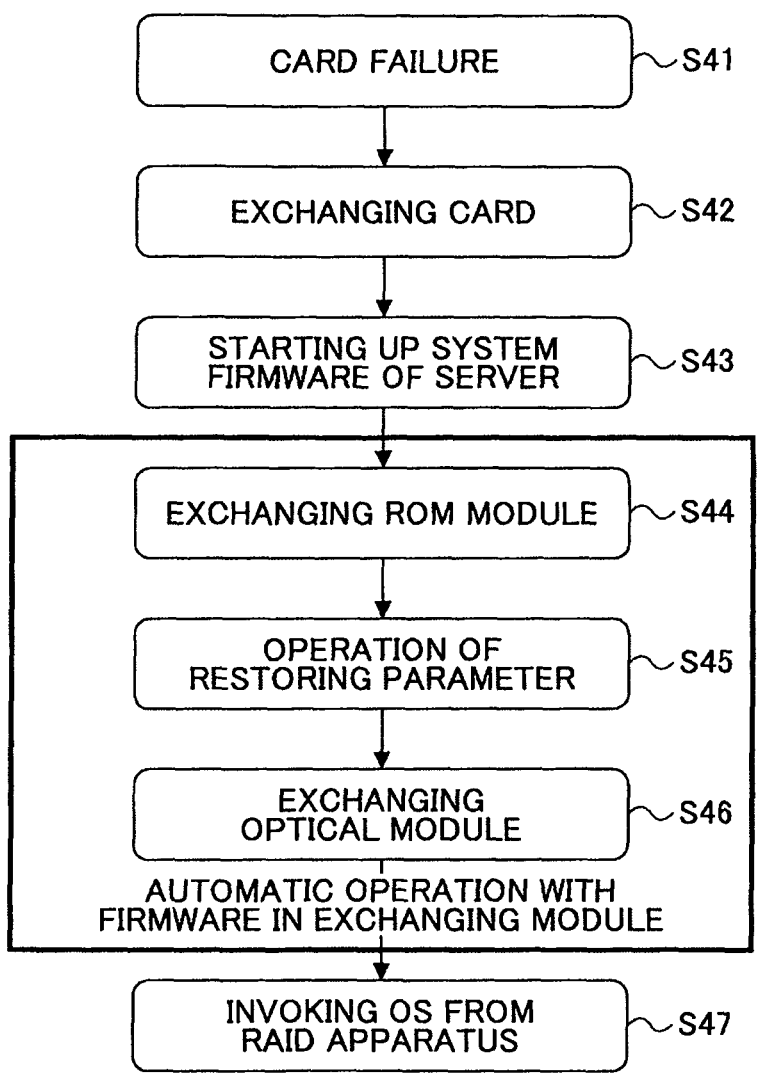
FIG. 7 is a second flow chart for illustrating a function and effect of the fibre channel card of Embodiment 1.
Figure 8:
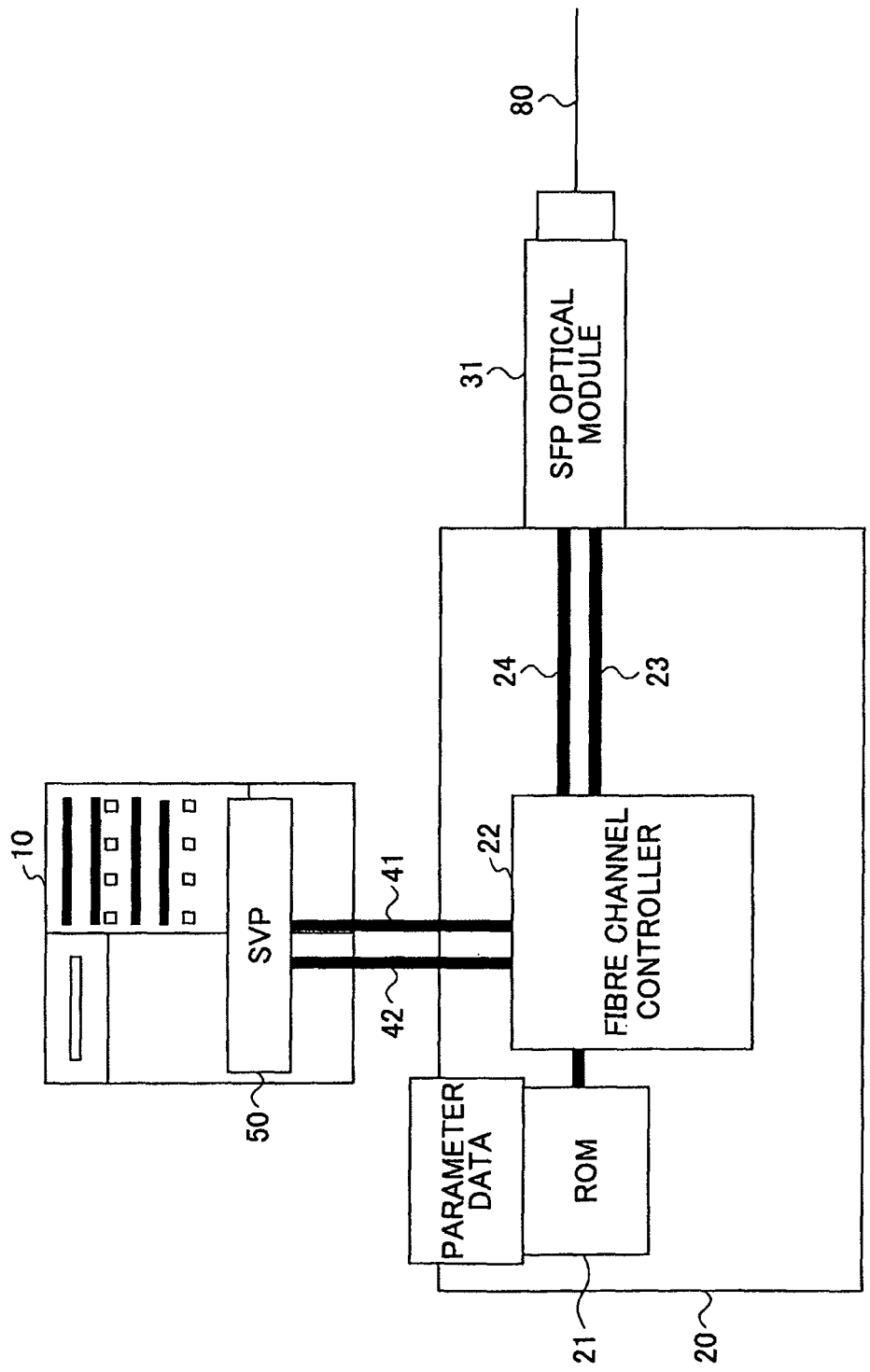
FIG. 8 is a block chart for illustrating a structure of a fibre channel card of Embodiment 2.
Figure 9:
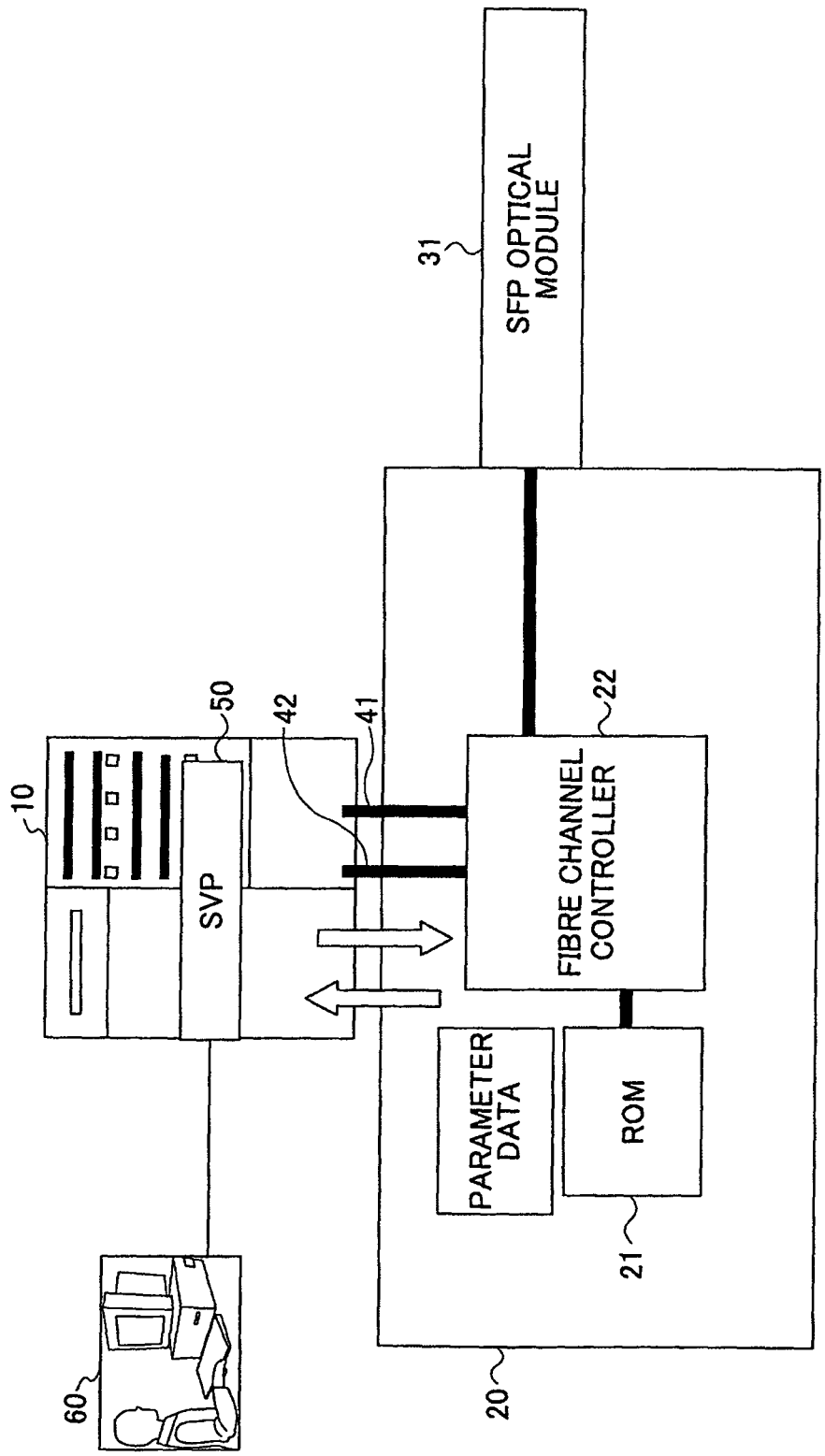
FIG. 9 is a block chart for illustrating a structure of the fibre channel card of Embodiment 2.

Referring to FIG. 6 and FIG. 7 along with FIG. 5A and FIG. 5B, functions and effects of Embodiment 1 are described in detail.

A backup operation of the parameter data in the fibre channel card 20 is described.

First, an administrator checks the RAID apparatus 100 to be connected by the server 10 (step S31 of FIG. 6). Thereafter, the administrator installs the fibre channel card 20 in the server (step S32). Then, the administrator uses an administrating terminal 60 to start up the system firmware (step S33). After starting up the system firmware, the administrator carries out, by using the administrating terminal 60, an operation of writing the parameter data in the new ROM 21, which are for the SAN boot in the RAID apparatus 100 to be connected to the fibre channel card 20, in the fibre channel card 20 (step S34).

Then, the administrator exchanges the optical module (SFP optical module) 31 of the fibre channel card 20 installed in the server 10 for the SFP ROM module (step S35). Thereafter, the administrator instructs executing the boot code inside the ROM 21 of the fibre channel card 20 with the system firmware from the administrating terminal 60. Based on the executed boot code, the parameter data are read in the server 10 from the ROM 21 of the fibre channel card 20 using a ROM read command of the fibre channel controller 22 and a read command of the PCI or the PCI-Express. The read parameter data are written in the fibre channel controller 22 by using a write command of the PCI or the PCI-Express. After writing the parameter data in the fibre channel controller 22, the write command of the I2C is used based on the boot code related to the above command, and the written parameter data pass through the fibre channel controller 22 and the bus of the I2C of the fibre channel card and are written in the built-in ROM 32a of the exchanged SFP ROM module (step S36).

After writing the parameter data in the built-in ROM 32a of the ROM module (SFP ROM module) 32, the administrator exchanges the ROM module (SFP ROM module) 32 installed in the fibre channel card 20 which had been installed in the server 10 by the originally installed optical module (SFP optical module) 31 (step S37). Thereafter, the ROM module (SFP ROM module) is preserved.

Thereafter, the administrator operates the administrating terminal 60 to invoke the OS on the server 10 with the SAN boot (step S38). In the SAN boot, the parameter data being setup information for the SAN boot are read from the ROM 21 of the fibre channel card 20. By reading out the OS data from the RAID apparatus 100 to be connected based on the read parameter data, the SAN boot is carried out.

Next, the recovery operation of the parameter data after replacing the fibre channel card is described.

Referring to FIG. 7, when the fibre channel card 20 fails (step S41), the administrator exchanges the fibre channel card installed in the server 10 for the new fibre channel card 20' (step S42). Thereafter, the administrator uses an administrating terminal 60 to start up the system firmware (step S43).

The administrator further exchanges the new SFP optical module 31 of the exchanged fibre channel card 20' with the preserved SFP ROM module 32 in step S44.

Thereafter, the administrator indicates the boot code inside the ROM 21 of the fibre channel card 20' with the system firmware from the administrating terminal 60. The indicated boot code carries out the following operations using the read command of the I2C. Said differently, the parameter data are read by the new fiber channel controller 22 of the exchanged fibre channel card 20' via the I2C for SFP from the built-in ROM 32a of the exchanged ROM module (SFP ROM module) 32. Next, using the read command of the PCI or PCI-Express, the parameter data are read from the fibre channel controller 22 to the server 10. Then, the ROM write command of the fibre channel controller or the write command of the PCI or PCI-Express are used to thereby write the parameter data to the ROM 21 of the exchanged fibre channel card 20'(step S45).

Thereafter, the ROM module (SFP ROM module) 32 installed in the exchanged fibre channel card 20' is exchanged for the optical module 31 to put it back in place (step S46). The SFP ROM module 32 is preserved again.

Thereafter, the administrator operates the administrating terminal 60 to invoke the OS on the server 10 with the SAN boot (step S47). In the SAN boot, the parameter data being setup information for the SAN boot are read from the ROM 21 of the fibre channel card 20'. By reading out the OS data from the RAID apparatus 100 to be connected based on the read parameter data, the SAN boot is carried out.

As described with Embodiment 1, the SFP ROM module 32 including the built-in ROM 32a which can be exchanged for the optical module 31 and can be connected to the I2C interface is installed in the ROM module (SFP ROM module) 32 The ROM module (SFP ROM module) 32 is connected as an element in which the parameter data are stored.

The I2C interface for connecting the fibre channel controller 22 to the optical module (SFP optical module) 31 is used to check a state or information of the optical module (SFP optical module). The I2C interface is used to read out or write in the parameter data from or into the exchanged ROM module (SFP ROM module) 32.

Functions enabling reading or writing the parameter data of the ROM 21 exist in the boot code. It becomes possible to automatically read or write the parameter data from or into the built-in ROM 32a of the ROM module (SFP ROM module) 32 using the read-write command of the I2C by the boot code. An instruction of reading or writing the parameter data is manually carried out using the control command of the boot code.

With Embodiment 1, the following operations are carried out by replacing the ROM module (SFP ROM module) 32 and the control command operations on the system firmware. Said differently, the parameter data are recovered so as to be stored in the ROM 21 after backing up the parameter data as the information for the SAN boot and replacing the fibre channel card 20. Consequently, it becomes unnecessary for the administrator to confirm structural information or input parameter data in replacing the fibre channel card. Therefore, an operation time for this can be shortened. With Embodiment 1, by storing the parameter data of the fibre channel card 20 installed in the server 10 in the built-in ROM 32a of the ROM module (SFP ROM module) 32, the setup information is accurately stored even if the fibre channel card fails, to thereby avoid an operational mistake.

Said differently, with Embodiment 1, the I2C interface between the fibre channel controller 20 and the optical module 31 originally used for checking information of the optical module 31 is utilized in Embodiment 1. By connecting the ROM module (SFP ROM module) 32 which can be connected by the I2C and exchanged for the optical module 31, the ROM module (SFP ROM module) 32 is used to store the parameter data as setup information for the SAN boot. Reading or writing data between the fibre channel controller 22 and the optical module (SFP optical module) 31 can be automatically carried out by the boot code of the system firmware. In this case, the read-write command of the I2C is used.

Embodiment 2 is described with reference to FIG. 8 to FIG. 11.

The structure of Embodiment 2 is similar to that of Embodiment 1. Different portions are mainly described below.

As described, the setup information for the SAN boot is recorded in the ROM 21 of the fibre channel card 20. In addition to a bus 41 for the data signal of the PCI or PCI-Express, there is a bus 42 of the I2C used to check information of the fibre channel controller 22 on the fibre channel card 20. It is possible to store or read parameter data in or from a ROM 21 using a ROM read-write command of the fibre channel controller 22 from an SVP 50 of the server 10.

With Embodiment 2, the parameter data in the ROM 21 are read by the SVP 50 of the server 10 via the bus of the I2C using a read command of the I2C related to the PCI or PCI-Express bus. With this, various parameter data such as a WWN of a RAID apparatus on a connection destination and a Target ID, Link Speed, or the like of the RAID apparatus which are setup information pieces for the SAN boot stored in the ROM 21 are taken out from the ROM 21 and stored in the server 10. Then, the parameter data are written in the ROM 21 of the fibre channel card 20 via the bus of the I2C from the server 10 using the write command of the I2C executed on the SVP 50.

With Embodiment 2, the parameter data being the setup information for the SAN boot are stored in the server 10, and the parameter data related to the storage are used to thereby restore the data in the ROM 21 of the fibre channel card 20. Therefore, after the fibre channel card 20 fails, the SVP 50 instructs writing the parameter data from the server 10 to the ROM 21. Consequently, the parameter data can be restored. With Embodiment 2, the setup information for the SAN boot is preserved and restored as described. Consequently, it is possible to easily inherit information in the fibre channel card 20 when the fibre channel card 20 fails. Further, it is possible to surely prevent a setup mistake in inheriting the information.

With Embodiment 2, the I2C interface which is used in checking the information of the fibre channel card 20 and provided separate from the interface of the PCI or PCI-Express signal is used. By using the I2C interface, the parameter data existing in the ROM 21 in the fibre channel card 20 are read and stored in the server 10. Said differently, by using the read command of the I2C and the ROM read command of the fibre channel controller 22, the parameter data are read in the server 10 from the ROM 21. After replacing the fibre channel card 20, the write command of the I2C is used to thereby write the parameter data in the fibre channel controller of the exchanged fibre channel card 20' from the server 10 by using the write command of the I2C. By using the ROM write command of the fibre channel controller, the parameter data are written in the new ROM 21 of the exchanged fibre channel card 20'. With this operation, the parameter data of the fiber channel card 20 are inherited in the exchanged fibre channel card 20'.

Referring to FIG. 8 to FIG. 11, the operation of Embodiment 2 is described in detail.

At first, a backup operation of the parameter data in the fibre channel card 20 is described.

Figure 10:
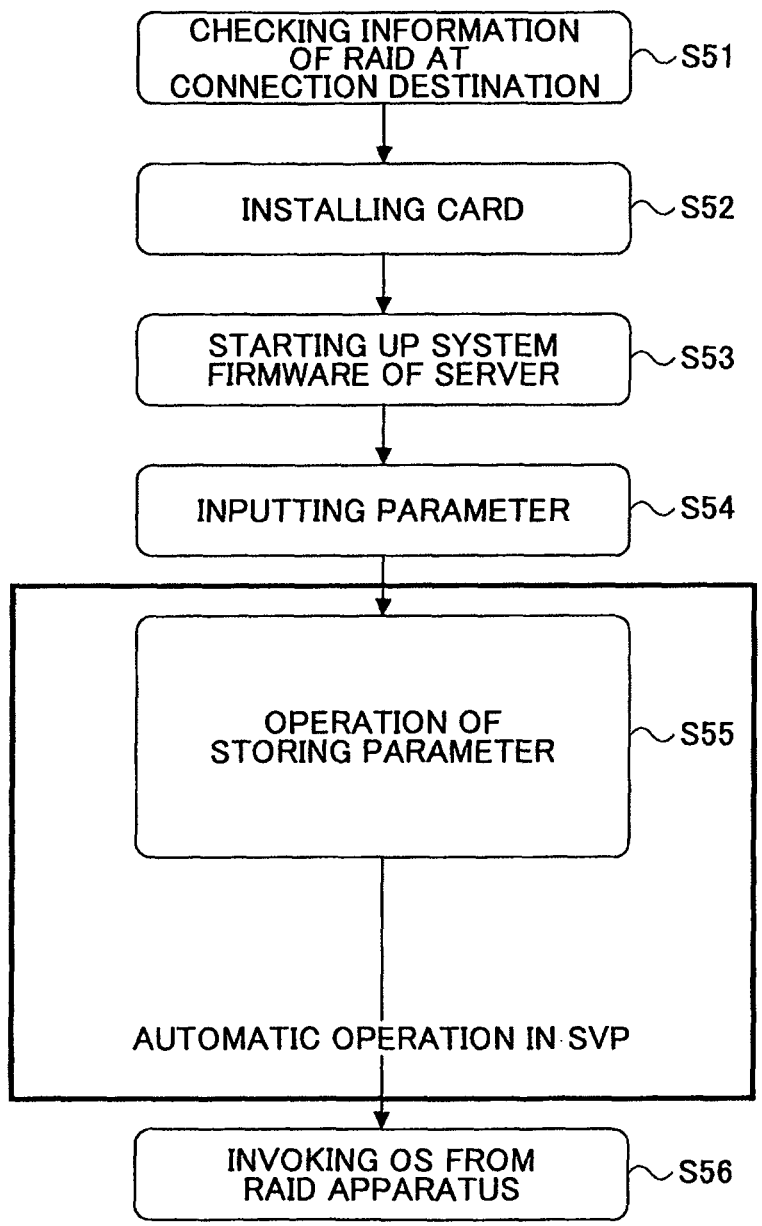
FIG. 10 is a first flow chart for illustrating a function and effect of the fibre channel card of Embodiment 2.

An administrator checks the RAID apparatus 100 to be connected by using the server 10 (step S51 of FIG. 10). Thereafter, the administrator installs the fibre channel card 20 in the server 10 (step S52). Then, the administrator uses an administrating terminal 60 to start up system firmware (step S53). After starting up the system firmware, the administrator carries out by the administrating terminal 60 an operation of setting the parameter data, which are for the SAN boot in the RAID apparatus 100 to be connected to the fibre channel card 20, in the fibre channel card (step S54).

Next, the administrator instructs executing the ROM read command of the fibre channel controller 22 on the fibre channel card 20 and the read command of the I2C with the SVP 50 of the server 10 from the administrating terminal 60. In compliance with the instructed command, the parameter data are read in the server 10 from the ROM 21 of the fibre channel card 20 via the I2C between the server 10 and the fibre channel card 20, and stored in a ROM included in the server and administrated by the system firmware or the SVP 50 (step S55).

Thereafter, the administrator operates the administrating terminal 60 to thereby invoke the OS on the server 10 with the SAN boot (step S56). In the SAN boot, the parameter data being setup information for the SAN boot are read from the ROM 21 of the fibre channel card 20. By reading out OS data from the RAID apparatus 100 to be connected based on the read parameter data, the SAN boot is carried out.

Next, the recovery operation of the parameter data after replacing the fibre channel card is described.

Figure 11:
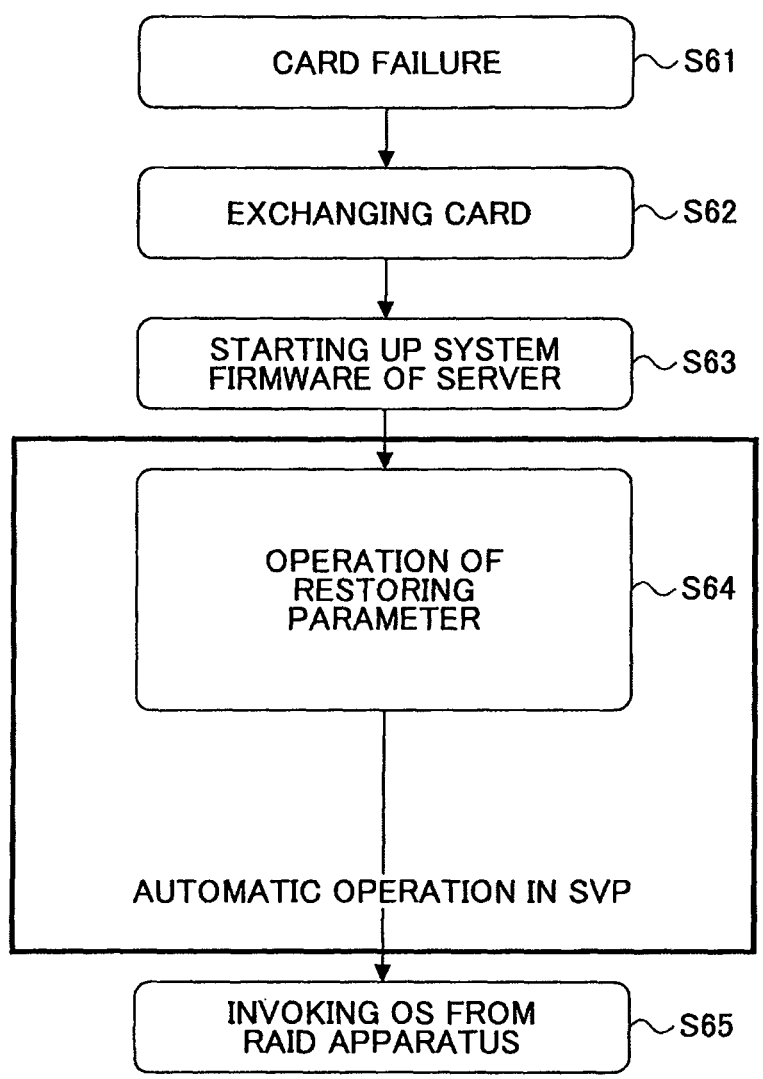
FIG. 11 is a second flow chart for illustrating a function and effect of the fibre channel card of Embodiment 2.
Figure 12:
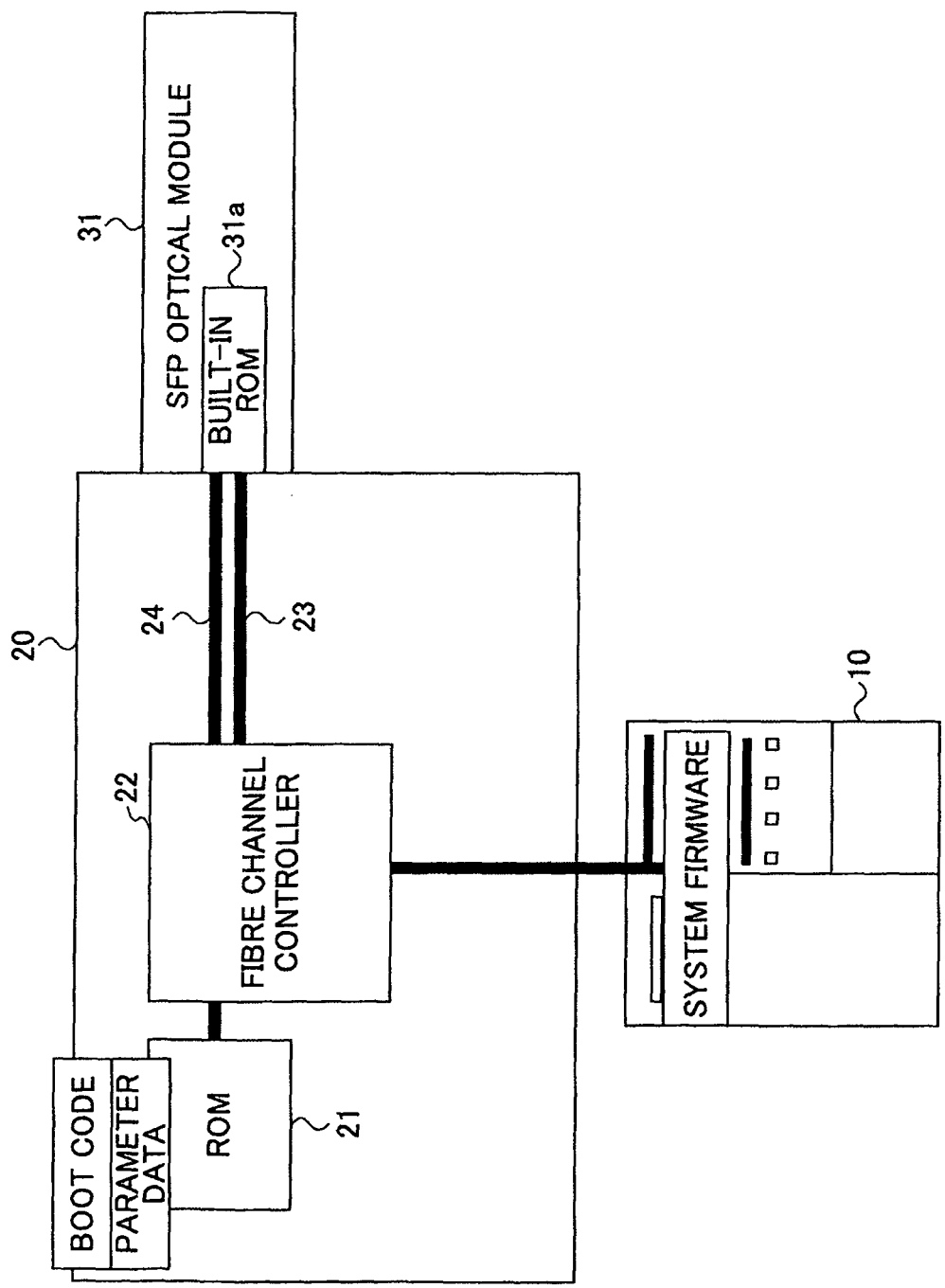
FIG. 12 is a block chart for illustrating a structure of a fibre channel card of Embodiment 3.
Figure 13:
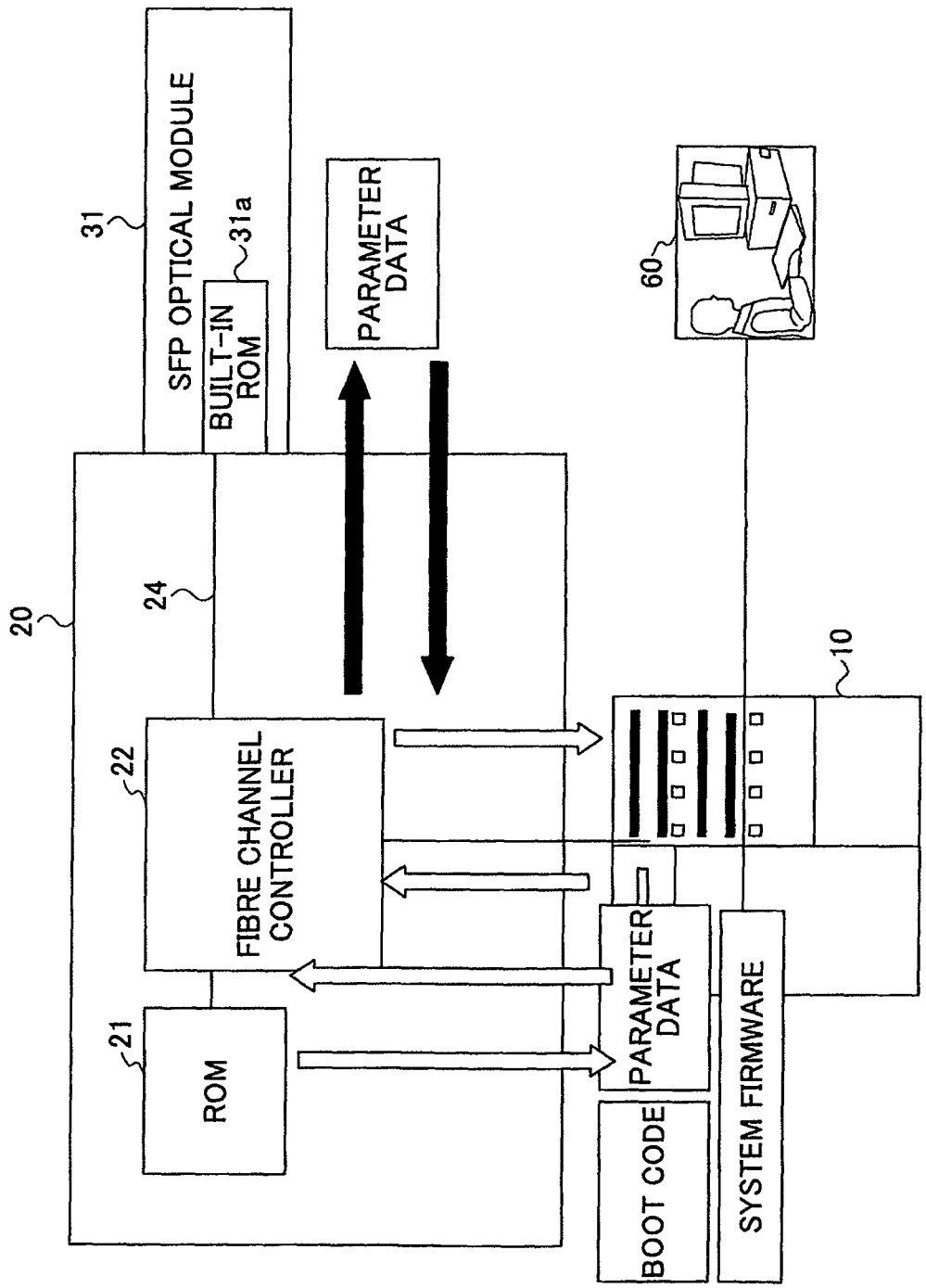
FIG. 13 is a block chart for illustrating a function and effect of the fibre channel card of Embodiment 3.

Referring to FIG. 11, when the fibre channel card 20 fails (step S61), the administrator exchanges the fibre channel card installed in the server 10 for the new fibre channel card 20' (step S62). Thereafter, the administrator operates the administrating terminal 60 to thereby start up the system firmware (step S63).

Thereafter, the administrator instructs executing the write command of the I2C and the ROM write command of the fibre channel controller 22 by the SVP 50 via the administrating terminal 60. In conformity with the instructed command, the SVP 50 reads the stored parameter data in conformity with the instructed command, and writes the parameter data to the new ROM 21 of the exchanged fibre channel card 20' via the I2C (step S64). The stored parameter data are stored in the ROM which is administrated by the system firmware or the SVP 50 by the above described operation with reference to FIG. 10. Thereafter, the administrator operates the administrating terminal 60 to thereby invoke the OS on the server 10 with the SAN boot (step S65). The bus 42 of the I2C existing between the server 10 and the new fibre channel card 20' is ordinarily used to monitor the fibre channel controller 22. However, in this case, the bus 42 of the I2C is used to read or write the parameter data in the ROM 21 of the fibre channel card 20'. For this, it is for the server to read or write the parameter data from or into the ROM 21 of the fibre channel card 20' via the I2C. Therefore, the SVP 50 of the server 10 automatically reads or writes the parameter data from or into the ROM 21 using the read-write command of the I2C. With this, it is possible to store or restore the parameter data. It is possible to make the SVP 50 automatically instruct reading or writing the parameter data. Said differently, functions of detecting the exchange of the fibre channel card 20 and of detecting the setup information are used by the SVP 50. With these functions, when the exchange of the fibre channel card 20 and the setup information are detected, it is possible to send an instruction to automatically read and write the parameter data.

With Embodiment 2, when the fibre channel card storing the setup information for the SAN boot fails, it is possible to carry out the following operations by executing a control command on the SVP 50 of the server 10. Said differently, the parameter data being the setup information for the SAN boot are backed up, and the new ROM of the exchanged fibre channel card 20' is recovered after the fibre channel card 20 is exchanged. Consequently, it becomes unnecessary for the administrator to confirm structural information or input parameter data in replacing the fibre channel card 20. Therefore, work time for this exchange can be shortened. Further, the parameter data of the fibre channel card 20 installed in the server 10 are stored in the server 10 (specifically, in the ROM administrated by the system firmware or SVP 50 as described above). Consequently, the setup information is accurately stored after the fibre channel card 20 fails and an operational mistake is avoidable.

With Embodiment 2, the interface of the I2C in the PCI or PCI-Express bus used for checking information by the fibre channel controller 22 of the fibre channel card 20 is used to read or write the parameter data. With this, it is possible to store the parameter data being setup information for the SAN boot and restore the parameter data in the new fibre channel card 20'. The reading or writing of data between the server 10 and the fibre channel controller 22 is carried out by the SVP 50 of the server 10 using the read-write command of the I2C. The SVP 50 has functions of automatically detecting the exchange of the fibre channel card 20 and the existence of the parameter data.

Therefore, the SVP 50 detects the exchange of the fibre channel card 20 installed in the server 10 with the new fibre channel card 20' and also detects storage of the parameter data in the ROM administrated by the system firmware or the SVP 50. Upon the detection of these, the SVP 50 is triggered to read the parameter data from the ROM administrated by the system firmware or the SVP 50, and writes the parameter data in the ROM 21 of the exchanged fibre channel card 20'. Said differently, with Embodiment 2, the restoration operation of the parameter data being the setup information for the SAN boot is totally automated.

With Embodiment 2, the parameter data are automatically stored. Said differently, the first fibre channel card installed in the server 10 is exchanged for a second fibre channel card, and a ROM 21 of the second fibre channel card already has a parameter. In this case, the SVP 50 detects the exchange of the fibre channel cards and also detects that the parameter data are stored in the ROM 21 of the second fibre channel card. Upon the detection of these, the SVP 50 is triggered to read out the parameter data from the ROM 21 in the second fibre channel card. The SVP 50 writes the read parameter data into a ROM which is administrated by the system firmware or the SVP 50. Said differently, with Embodiment 2, the restoration operation of the parameter data being the setup information for the SAN boot is totally automated.

Hereinafter, Embodiment 3 is described with reference to FIG. 12 to FIG. 15.

The structure of Embodiment 3 is similar to that of Embodiment 1. Different portions are mainly described below.

As described, the information for the SAN boot is recorded in the ROM 21 of the fibre channel card 20. Between the fibre channel controller 22 of the fibre channel card 20 and the optical module (SFP optical module) 31, there is a bus of the I2C used for checking information of the optical module 31 in addition to a signal bus for transmitting a fibre channel signal. A ROM (built-in ROM) 31*a* included in the optical module (SFP optical module) 31 stores specification information (manufacture name and type number in the manufacture) and state information. It is possible to set up or read out parameter data in or from the ROM 21 using a ROM read-write command of a fibre channel controller 22 from system firmware of a server 10.

With Embodiment 3, parameter data are written in the ROM (built-in ROM) 31*a* included in the optical module (SFP optical module) 31 by using a write command of the I2C for SFP with a boot code included in the ROM 21 of the fibre channel card 20 and carried out by the system firmware. Said differently, the parameter data being information which is stored in the ROM 21 and is for an SAN boot are taken out. The taken out parameter data are stored in the ROM (built-in ROM) 31*a* of the optical module (SFP optical module) 31. For example, the parameter data have a WWN of a RAID apparatus on a connection destination, or Target ID information, Link Speed, or the like of the RAID apparatus.

Alternatively, the parameter data are read in from the ROM 31*a* of the optical module 31 by using the read command of the I2C for the SFP with the boot code which is carried out on the system firmware. The read parameter data are written in the ROM 21 of the fibre channel card 20.

With Embodiment 3, the parameter data are stored in the built-in ROM 31*a* of the optical module 31. The parameter data are restored to the ROM 21 of the fibre channel card 20 from the built-in ROM 31*a* of the optical module 31. Therefore, after an exchange for the failed fibre channel card 20, the system firmware of the server 10 is used to read the parameter data from the ROM 31*a* of the optical module 31. The read parameter data are written in a new ROM 21 of a exchanged fibre channel card 20'. This read and write operation may be carried out when an administrator sends an instruction to do so by using the system firmware of the server 10. As a result, when the fibre channel cards 20 are exchanged, the parameter data can be easily restored. Therefore, with Embodiment 3, the setup information stored in the fibre channel card 20 and being for the SAN boot is stored and restored thereby easily enabling inheritance of information from the failed fibre channel card 20. Further, it is possible to effectively prevent a setup mistake in inheriting the information.

Used with Embodiment 3 is the built-in ROM 31*a*, which is connected to an interface of the I2C, is included in the optical module 31, and exists in addition to an interface for fibre channel communication. The parameter data stored in the ROM 21 of the fibre channel card 20 are stored in the ROM (built-in ROM) 31*a*. By using the write command of I2C, the parameter data read from the ROM 21 are written in the built-in ROM 31*a* of the ROM module 31. After replacing the fibre channel card 20, the following operation is carried out. Using the read command of the I2C, the parameter data of the fibre channel card before the exchange are read from the ROM (built-in ROM) 31*a* of the optical module 31 installed in the original fibre channel card 20. The read parameter data are written in the new ROM 21 of the exchanged fibre channel card 20'. With this operation, the parameter data of the fiber channel card 20 are inherited in the exchanged fibre channel card 20'.

Hereinafter, the operations of Embodiment 3 are described in detail with reference to FIG. 12 to FIG. 15.

A backup operation of the parameter data in the fibre channel card 20 is described.

Figure 14:
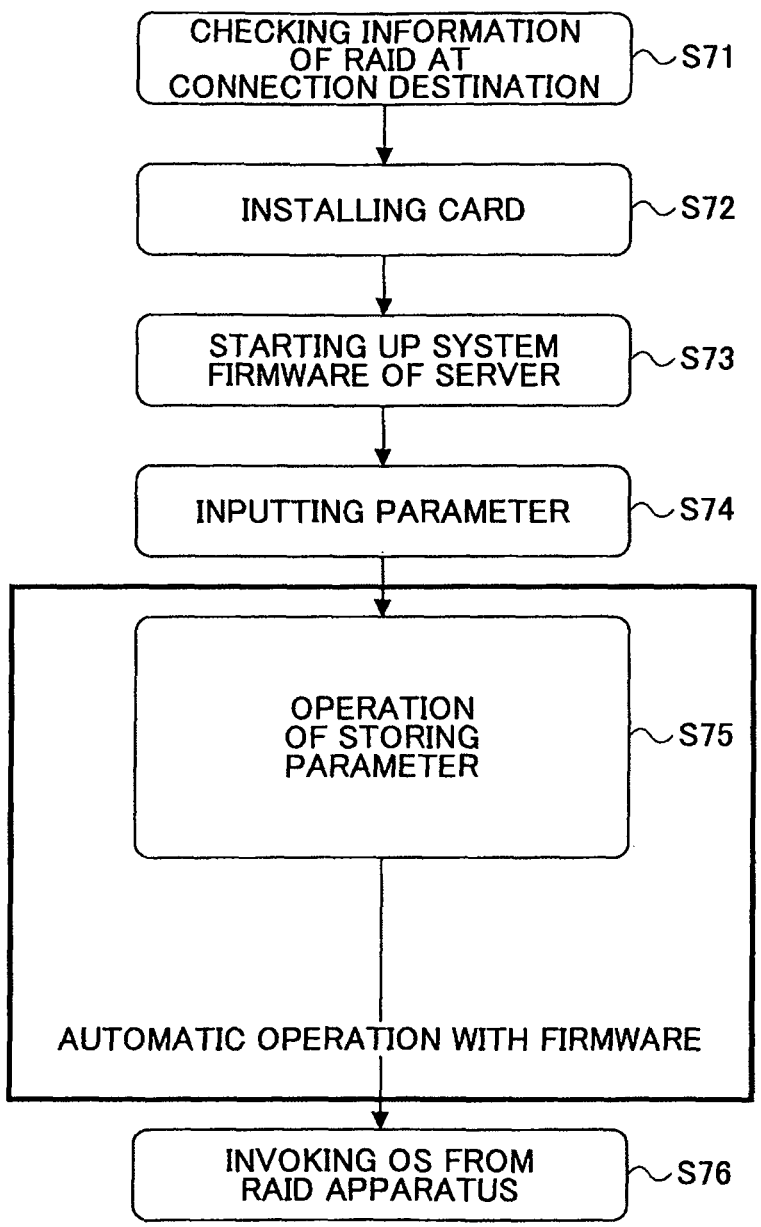
FIG. 14 is a first flow chart for illustrating a function and effect of the fibre channel card of Embodiment 3.

An administrator checks the RAID apparatus 100 to be connected by the server 10 (step S71 of FIG. 14). Thereafter, the administrator installs the fibre channel card 20 in the server 10 (step S72). Then, the administrator uses an administrating terminal 60 to start up system firmware (step S73). After starting up the system firmware, the administrator carries out with the administrating terminal 60 an operation of setting the parameter data, which are for the SAN boot in the RAID apparatus 100 to be connected to the fibre channel card 20, in the fibre channel card 20 (step S74).

Next, the administrator uses the system firmware of the server 10 to thereby instruct executing the boot code stored in the ROM 21 of the fibre channel card 20. The parameter data are read into the server 10 from the ROM 21 of the fibre channel card by the executing boot code. In this case, a ROM read command of the fibre channel controller 22 and a read command of a PCI or PCI-Express are used. The read parameter data are written in the fibre channel controller 22 by using a write command of the PCI or PCI-Express. When the parameter data are written in the fibre channel controller 22, the write command of the I2C is used by the boot code to thereby write the read parameter data into the ROM 31a of the optical module 31 which is installed in the fibre channel card 20. This write operation is carried out via the fibre channel controller 22 and the I2C of the SFP of the fibre channel card (step S75).

Thereafter, the administrator operates the administrating terminal 60 to invoke the OS on the server 10 with the SAN boot (step S76). In the SAN boot, the parameter data being setup information for the SAN boot are read from the ROM 21 of the fibre channel card 20. By reading out OS data from the RAID apparatus 100 to be connected based on the read parameter data, the SAN boot is carried out.

Next, an operation of restoring the parameter data to the fibre channel card is described.

Figure 15:
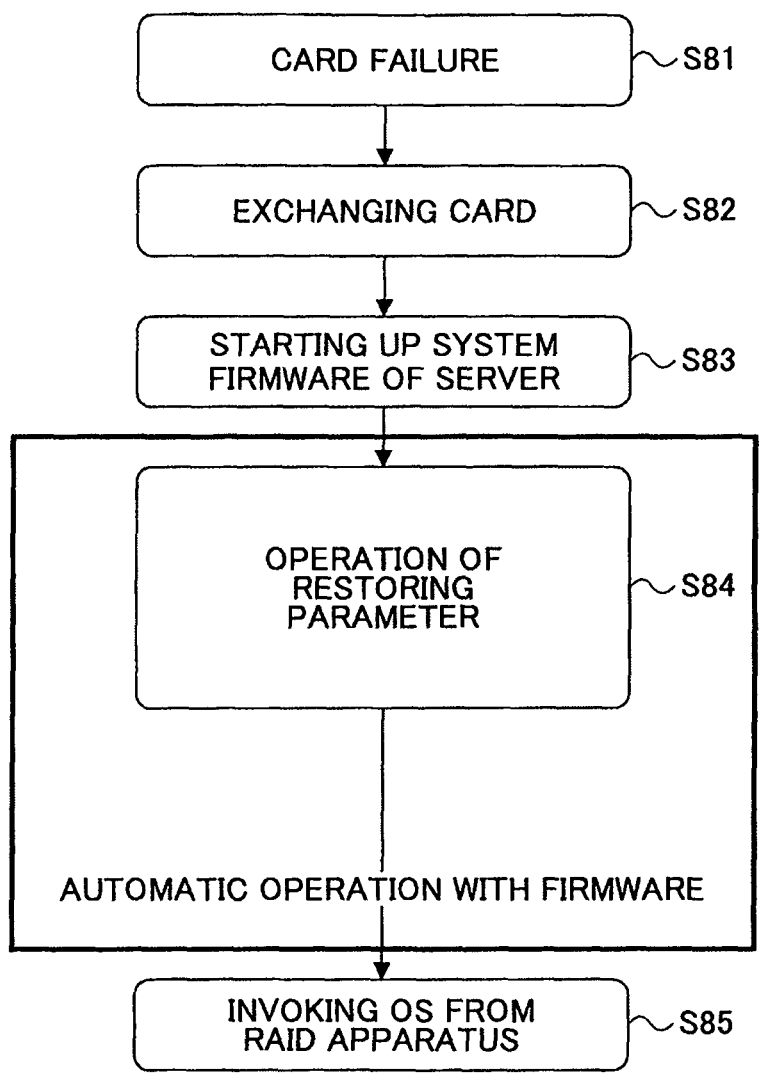
FIG. 15 is a second flow chart for illustrating a function and effect of the fibre channel card of Embodiment 3.
Figure 16:
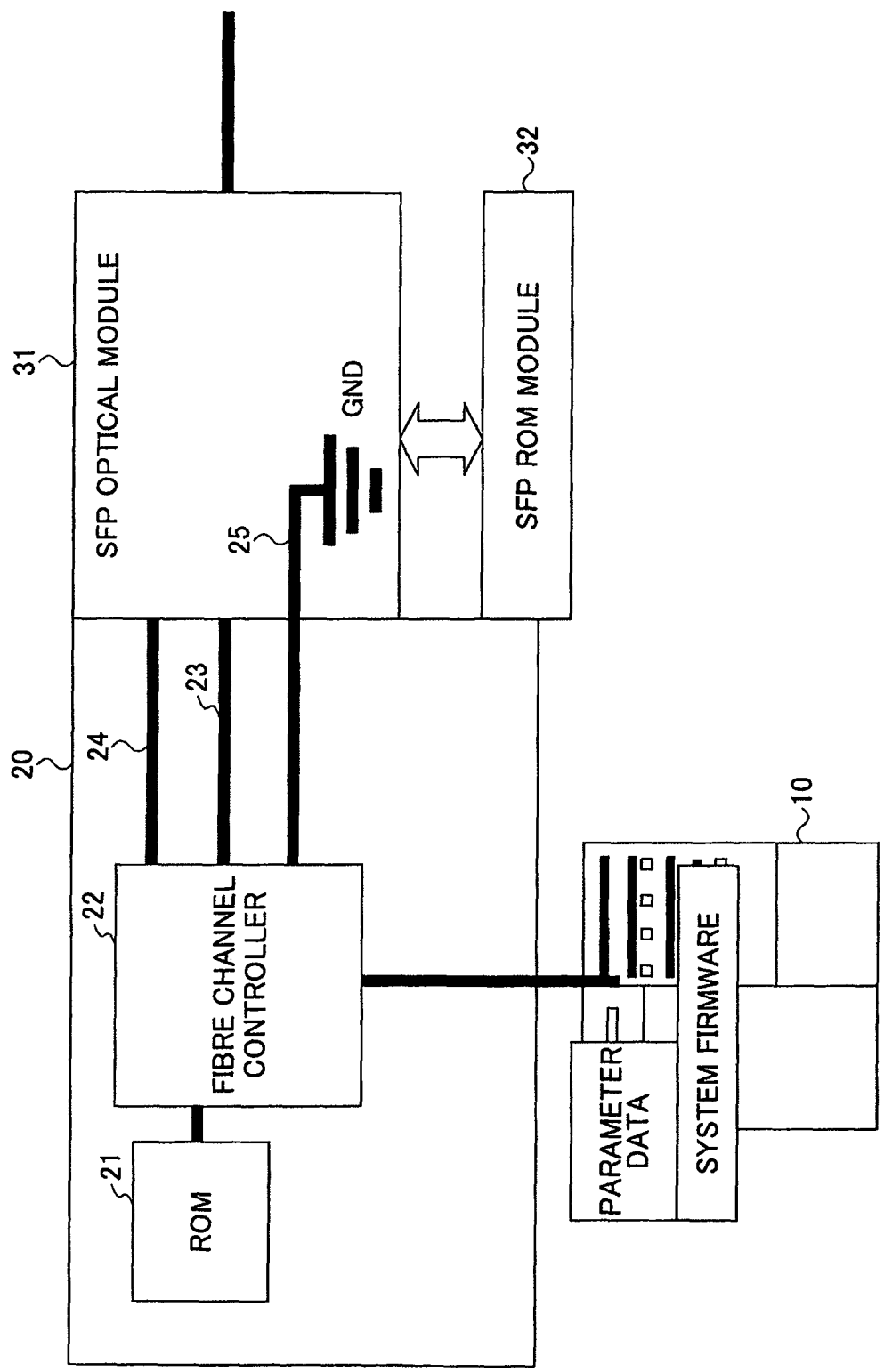
FIG. 16 is a block chart for illustrating a structure of a fibre channel card of Embodiment 4.
Figure 17:
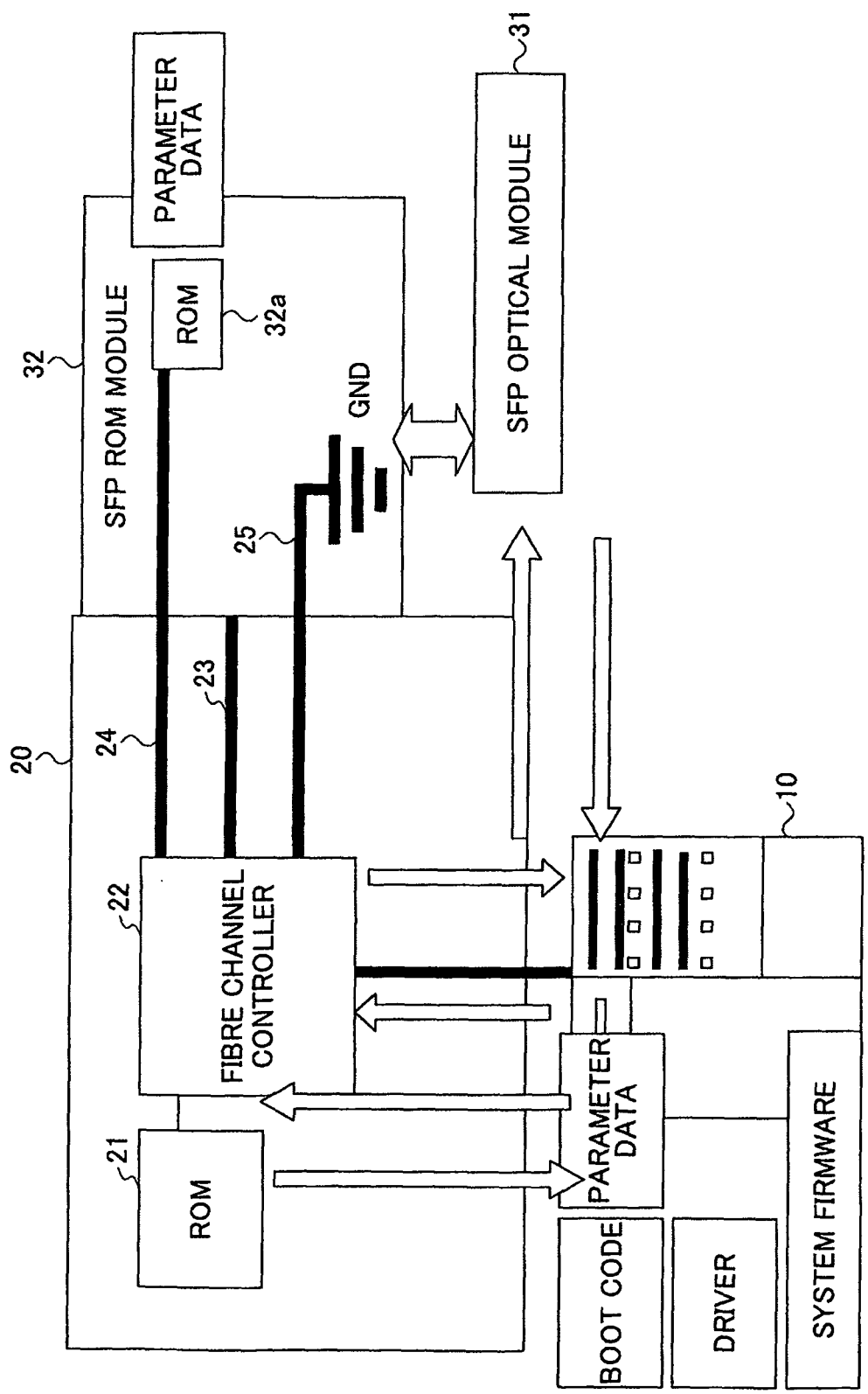
FIG. 17 is a block chart for illustrating a function and effect of the fibre channel card of Embodiment 4.

Referring to FIG. 15, when the fibre channel card 20 fails (step S81), the administrator exchanges the fibre channel card installed in the server 10 for the new fibre channel card 20' (step S82). When the fibre channel card 20 is exchanged, the administrator removes the optical module 31 from the original fibre channel card 20 and installs the removed optical module (SFP optical module) 31 in the exchanged fibre channel card 20'. Thereafter, the administrator operates the administrating terminal 60 to thereby start up the system firmware of the server 10 (step S83).

Next, the administrator uses the system firmware of the server 10 to thereby instruct executing the boot code stored in the ROM 21 of the fibre channel card 20' via the administrating terminal 60. The parameter data are read into the fibre channel controller 22 via the I2C for the SFP from the ROM 31a of the optical module (SFP optical module) 31 by the executing boot code using the I2C read command. In this case, the optical module (SFP optical module) 31 is removed from the original fibre channel card 20 and installed in the exchanged fibre channel card 20'. Next, using the read command of the PCI or PCI-Express, the parameter data are read from the fibre Channel controller 22 to the server 10. The read parameter data are written in the new ROM 21 of the exchanged fibre channel card 20'. The ROM write command of the fibre channel controller 22 and the write command of the PCI or PCI-Express are the write operations (step S84).

Thereafter, the administrator operates the administrating terminal 60 to invoke the OS in the server 10 with the SAN boot (step S85). In the SAN boot, the parameter data being setup information for the SAN boot are read from the ROM 21 of the fibre channel card 20'. By reading out OS data from the RAID apparatus 100 to be connected based on the read parameter data, the SAN boot is carried out.

With Embodiment 3, the ROM (built-in ROM) 31a in the optical module (SFP optical module) 31 is used as an element of storing the parameter data.

The I2C interface for connecting the fibre channel controller 22 to the optical module (SFP optical module) 31 is ordinarily used to check a state or information of the optical module (SFP optical module) 31. With Embodiment 3, this I2C interface is used to read or write the parameter data.

The functions of reading or writing the parameter data of the ROM 21 exist in the boot code. Further, the function of reading or writing the parameter data to or from the built-in ROM 31a of the SFP optical module 31 via the fibre channel controller 22 and the I2C for the SFP is provided in the boot code. Consequently, reading or writing the parameter data in the built-in ROM 31a of the SFP optical module 31 using the read-write command of the I2C with the boot code is automated. An instruction for reading or writing the parameter data is manually carried out using a control command of the boot code.

With Embodiment 3, the parameter data being information for the SAN boot are automatically carried out by operating the control command using the system firmware. After replacing the fiber channel card 20 by the fibre channel card 20', a recovery of the parameter data for the ROM 21 of the exchanged fibre channel card 20' is automatically carried out. Consequently, it becomes unnecessary for the administrator to check structural information or input parameter data in replacing the fibre channel card 20. Therefore, work time for this exchange can be shortened.

With Embodiment 3, the parameter data of the fibre channel card 20 installed in the server 10 are stored in the SFP ROM 31a of the SFP optical module 31. Consequently, after the fibre channel card 20 fails and is exchanged, the setup information is accurately inherited by the exchanged fibre channel card 20'. Thus, an operational mistake is avoidable.

Said differently, with Embodiment 3, the I2C interface between the fibre channel controller 22 and the optical module 31 originally used for checking information of the optical module 31 is utilized. The interface of the I2C is used to store and restore the parameter data which are information for the SAN boot using the built-in ROM 31a of the SFP optical module 31. Reading and writing of data between the fibre channel controller 22 and the optical module 31 are carried out by using the read-write command of the I2C with the boot code carried out by the system firmware of the server 10.

Next, Embodiment 4 is described with reference to FIG. 16 to FIG. 19.

The structure of Embodiment 4 is similar to that of Embodiment 1. Different portions are mainly described below.

As described, setup information for an SAN boot is recorded in a ROM 21 of a fibre channel card 20. Between the fibre channel controller 22 of the fibre channel card 20 and the optical module (SFP optical module) 31, there is a bus 24 of the I2C used for checking information of an SPF optical module 31 in addition to a signal bus for transmitting a fibre channel signal. The following operations may be carried out using a ROM read-write command of the fibre channel controller 22 in the fibre channel card 20 from the system firmware of the server 10. Said differently, the parameter data are stored in the ROM 21 of the fibre channel card 20, or the parameter data are read from the ROM 21. With Embodiment 4, a bus 25 for the detection signal is provided between the fibre channel controller 22 and the SFP optical module 31. By checking a voltage level of the detection signal, the system firmware can check a state of installing or uninstalling the SFP optical module 31 on or from the fibre channel card 20.

With Embodiment 4, parameter data are written in a built-in ROM 32a included in an SFP ROM module 32 by using a write command of the I2C for the SFP with boot code included in the ROM 21 of the fibre channel card 20. Various parameter data such as a WWN of a RAID apparatus on a connection destination and Target ID, Link Speed, or the like of the RAID apparatus which are setup information for the SAN boot stored in the ROM 21 are taken out from the ROM 21. The taken out parameter data are stored in the built-in ROM 32a of the SFP ROM module 32 which can be connected to the I2C interface and exchanged for the SFP optical module 31.

Alternatively, the SFP ROM module 32 is installed in the exchanged fibre channel card 20', the parameter data are read from the built-in ROM 32a of the SFP ROM module 32 using the read command of the I2C for the SFP, and the parameter data are written in the ROM 21 of the fibre channel cars 20'. These read and write operations are carried out by executing the boot code in the system firmware.

The bus 25 for a detection signal is connected to the SFP optical module 31 and the SFP ROM module 32, and further grounded. Consequently, it is possible to check a change of installing or uninstalling the SFP optical module 31 or the SFP ROM module 32 in or from the fibre channel card 20. By checking a change of the installing and uninstalling state and a state of the data stored in the built-in ROM 32a, it becomes unnecessary for an administrator to send an instruction. Said differently, with an automatic control of the server with the system firmware, the parameter data may be stored in the built-in ROM 32a of the SFP ROM module 32 from the fibre channel card 20, and the parameter data are restored in the exchanged fibre channel card 20'. With Embodiment 4, the parameter data may be stored in the built-in ROM 32a of the SFP ROM module 32, and the parameter data are restored in the new ROM 21 of the exchanged fibre channel card 20' from the built-in ROM 32a. With this, after the fibre channel card 20 fails and is exchanged for the exchanged fibre channel card, the parameter data are read from the built-in ROM 32a of the SFP ROM module 32 by the system firmware, and the read parameter data are written in the new ROM 21 of the exchanged fibre channel card 20'. These reading and writing operations are triggered to be carried out when the system firmware automatically instructs to do so upon a change of the detection signal. With this, the parameter data can be restored in the exchanged fibre channel card 20'. Consequently, the setup information stored in the fibre channel card 20 and being for the SAN boot can be easily preserved and restored thereby easily enabling inheritance of information in the failed fibre channel card 20. Further, it is possible to effectively prevent a setup mistake in inheriting the information.

With Embodiment 4, the SFP ROM module 32' corresponding to the interface of the I2C used to check the information of the SFP optical module 31 which is prepared in addition to the interface for the fibre channel communications is connected. Under this state, the parameter data in the ROM 21 of the fibre channel card 20 are stored in the built-in ROM 32a of the connected SFP ROM module 32. By using a write command of I2C, the parameter data read from the ROM 21 are written in the built-in ROM 32a of the ROM module 32. After replacing the fibre channel card 20, the read command of the I2C is used to read the parameter data from the built-in ROM 32a of the SFP ROM module 32. The parameter data are written in a new ROM 21 of the exchanged fibre channel card 20'. With this operation, the parameter data of the original fiber channel card 20 are inherited in the exchanged fibre channel card 20'. Further, the above operation can be carried out by automatic control with the system firmware of the server 10 through the bus 25 for the detection signal of the SFP optical module 31 or the SFP ROM module 32.

The system firmware uses the state change of the detection signal in the bus 25 for the detection signal from an open level (unconnected state) to a ground level (connected state) as a trigger. Said differently, when the SFP optical module 31 is removed from the fibre channel card 20 and the SFP ROM module 32 is installed instead of the SFP optical module 31, the SFP ROM module 32 after being installed becomes in the connected state. As a result, the bus 25 of the detection signal becomes in the ground level. Thus, the system firmware detects that the exchange for the SFP ROM module 32 is done.

When the parameter data are stored, it is detected by the system firmware that the SFP optical module 31 is exchanged for the SFP ROM module 32 relative to the fibre channel card 20 by the detected level of the detection signal. Further, the system firmware checks that the parameter data are stored in the ROM 21 of the fibre channel card 20. Upon detecting and checking as described above, the system firmware is automatically triggered to read the parameter data from the ROM 21 and write the read parameter data to the built-in ROM 32a of the ROM module. Said differently, the parameter data are automatically stored.

Further, when the parameter data are restored, it is detected by the system firmware that the SFP optical module 31 is exchanged by the SFP ROM module 32 relative to the fibre channel card 20 by the detected level of the detection signal. Further, the system firmware checks that the parameter data are stored in the built-in ROM 32a of the exchanged SFP ROM module 32. Upon detecting and checking as described above, the system firmware is automatically triggered to read the parameter data from the built-in ROM 32a of the SFP ROM module 32 and writes the read parameter data to the ROM 21 of the fibre channel card 20'. Said differently, the parameter data are automatically restored.

The operations of Embodiment 4 are further described in detail with reference to FIG. 16 to FIG. 19.

Firstly, a backup operation of the parameter data in the fibre channel card 20 is described.

Figure 18:
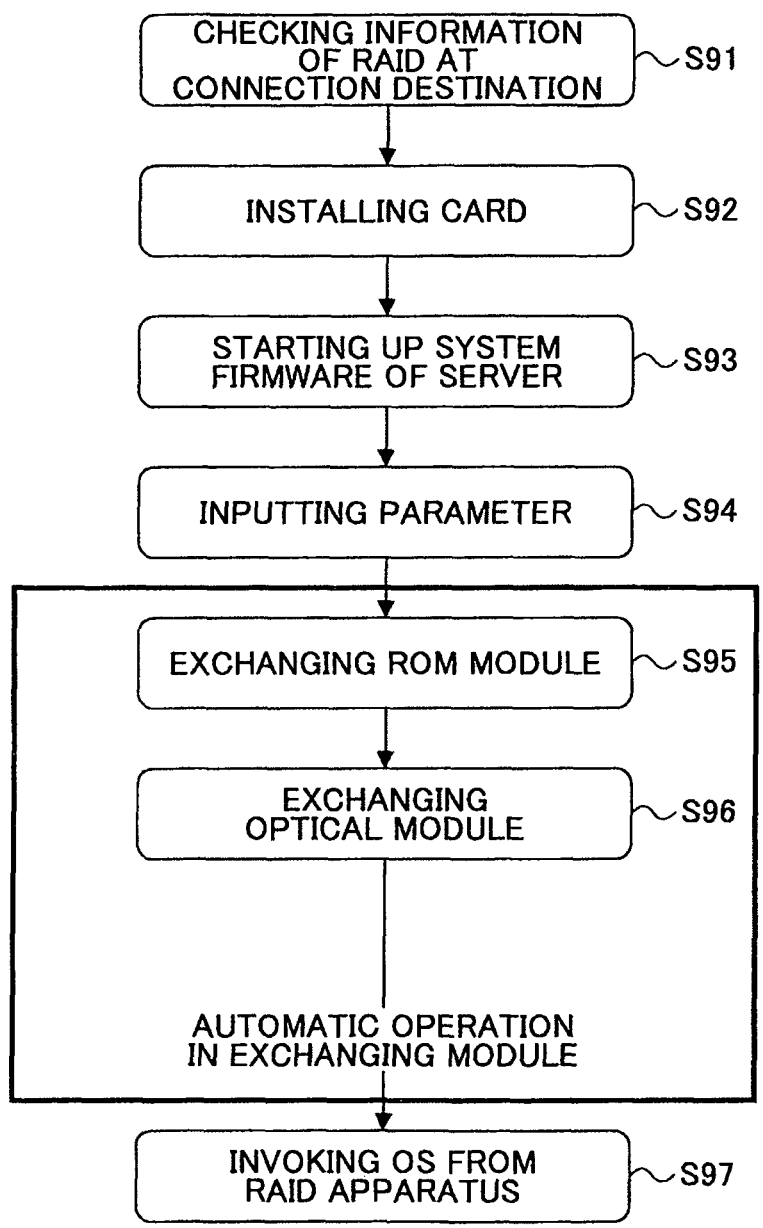
FIG. 18 is a first flow chart for illustrating a function and effect of the fibre channel card of Embodiment 4.

At first, the administrator checks the RAID apparatus 100 to be connected by the server 10 (step S91 of FIG. 18). Thereafter, the administrator installs the fibre channel card 20 in the server 10 (step S92). Then, the administrator uses the administrating terminal 60 to start up the system firmware (step S93). After starting up the system firmware, the administrator carries out with the administrating terminal 60 an operation of setting the parameter data, which are setup information for the SAN boot, in the fibre channel card 20 (step S94).

Then, the administrator exchanges the SFP optical module 31 of the fibre channel card 20 installed in the server 10 for the SFP ROM module 32 (step S95). The system firmware of the server 10 checks the state of the detection signal. Consequently, when the detection signal changes from the unconnected state (open level) to the connected state (ground level), the data are read from the built-in ROM 32a of the ROM module 32. With the read operation, the system firmware uses the read command of the I2C. The built-in ROM 32a of the SFP ROM module 32 is vacant without data written in it. This vacant state is checked by the system firmware. The system firmware checks that the parameter is written in the ROM 21 using the ROM read command of the fibre channel controller 22. Next, the system firmware reads the parameter data from the ROM 21 of the fibre card 20 to the server 10. With the reading operation, the ROM read command of the fibre channel controller 22 or the read command of the PCI or PCI-Express is used. Then, the read parameter data are written in the fibre channel controller 22 by using the write command of the PCI or PCI-Express. After writing the parameter data into the fibre channel controller 22 as described, the system firmware carries out the following operations using the write command of the I2C.

The written parameter data are written in the built-in ROM 32a of the exchanged ROM module 32 via the fibre channel controller 22 and the I2C for the SFP of the fibre channel card 20. As such, after writing the parameter data in the built-in ROM 32*a* of the SFP ROM module 32, the administrator exchanges the SFP ROM module 32 installed in the fibre channel card 20, which is installed in the server 20, for the originally installed SFP optical module 31 (step S96).

Thereafter, the administrator preserves the ROM module 32.

Thereafter, the administrator operates the administrating terminal 60 to invoke the OS on the server 10 with the SAN boot (step S97). In the SAN boot, the parameter data being setup data for the SAN boot are read from the ROM 21 of the fibre channel card 20. By reading out OS data from the RAID apparatus 100 to be connected based on the read parameter data, the SAN boot is carried out.

Second, a backup operation of the changed parameter data in the fibre channel card 20 is described.

In a similar manner to the above, the administrator first checks the RAID apparatus 100 to be connected by the server 10 (step S91 of FIG. 18). Thereafter, the administrator installs the fibre channel card 20 in the server 10 (step S92). Then, the administrator uses the administrating terminal 60 to start up the system firmware (step S93). After starting up the system firmware, the administrator carries out with the administrating terminal 60 an operation of storing the parameter data, which are setup information for the SAN boot, in the fibre channel card (step S94).

Then, the administrator exchanges the SFP optical module 31 of the fibre channel card 20 installed in the server 10 for the SFP ROM module 32. The system firmware checks the state of the detection signal. When it is determined that the detection signal is changed from the unconnected state (open level) to the connected state (ground level), the system firmware reads the data of the built-in ROM 32*a* by using the read command of the I2C. At the same time, it is determined that the built-in ROM 32*a* of the SFP ROM module 32 is not vacant. Next, the system firmware reads the parameter data in the ROM 21 into the server 10 by using the ROM read command of the fibre channel controller 22 of the fibre channel card 20. The read parameter data are compared with the data read from the built-in ROM 32*a* of the SFP ROM module 32. When it is determined that the read parameter data and the data read from the built-in ROM 32*a* are different, the following operation is carried out.

Next, the system firmware reads the parameter data from the ROM 21 of the fibre card 20 into the server 10. With the reading operation, the ROM read command of the fibre channel controller 22 or the read command of the PCI or PCI-Express is used. Then, the read parameter data are written in the fibre channel controller 22 by using the write command of the PCI or PCI-Express. After writing the parameter data into the fibre channel controller 22 as described, the system firmware carries out the following operations using the write command of the I2C. The written parameter data are written in the exchanged ROM module 32 via the fibre channel controller 22 and the I2C for the SFP of the fibre channel card 20.

Thereafter, the administrator exchanges the SFP ROM module 32 installed in the fibre channel card 20 for the original SFP optical module 31. Thereafter, the administrator preserves the ROM module 32.

Next, a recovery operation of the parameter data after replacing the fibre channel card is described.

Figure 19:
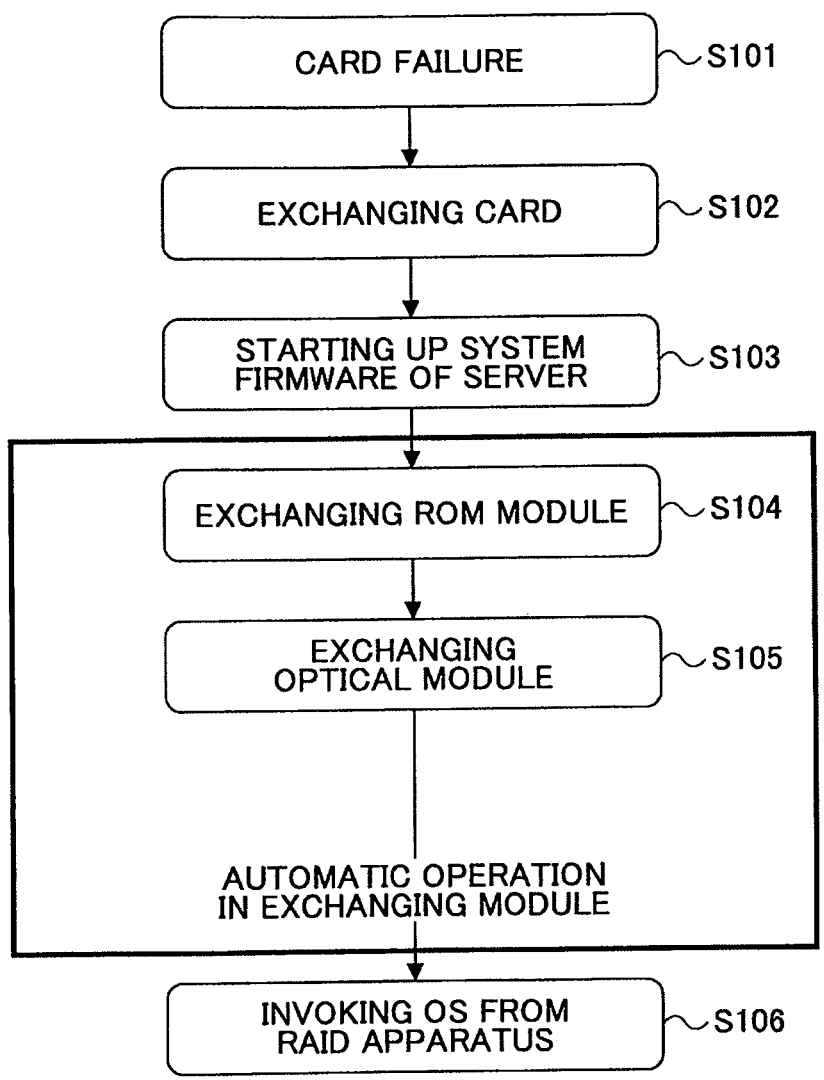
FIG. 19 is a second flow chart for illustrating a function and effect of the fibre channel card of Embodiment 4.

Referring to FIG. 19, when the fibre channel card 20 installed in the server 10 fails (step S101), the administrator exchanges the fibre channel card 20 for the new fibre channel card 20' (step S102). Thereafter, the administrator operates the administrating terminal 60 to thereby start up the system firmware (step S103).

The administrator further exchanges the new SFP optical module 31 installed in the exchanged fibre channel card 20' for the preserved SFP ROM module 32 in step S104. Consequently, the system firmware checks the state of the detection signal. After checking that the detection signal is changed from the unconnected state (open level) to the connected state (ground level) by replacing the ROM module, the following operation is carried out.

It is determined whether the parameter data are written in the ROM 32*a* of the SFP ROM module 32 in order to read the parameter data in the ROM 32*a* using the read command of the I2C with the system firmware. It is determined whether the ROM 21 of the fibre channel card 20' is vacant using the ROM read command of the fibre channel controller 22. The parameter data are read from the built-in ROM 32*a* of the ROM module 32, and the parameter data are read in the ROM 21 of the exchanged fibre channel card 20'. The writing operation is carried out by the system firmware using the ROM write command of the fibre channel controller 22. Thereafter, the ROM module (SFP ROM module) 32 installed in the exchanged fibre channel card 20' is exchanged for the optical module 31 to put it back in place (step S105). Thereafter, the administrator preserves the ROM module 32 again.

Thereafter, the administrator operates the administrating terminal 60 to invoke the OS on the server 10 by the SAN boot (step S106). In the SAN boot, the parameter data being setup information for the SAN boot are read from the ROM 21 of the fibre channel card 20'. By reading out OS data from the RAID apparatus 100 to be connected based on the read parameter data, the SAN boot is carried out.

It is also possible to control the fibre channel controller 22 of the fibre channel card 20 when the administrator instructs via the system firmware to do so. With Embodiment 4, the bus 25 for the detection signal is used and the change of the voltage level of the detection signal is used as the trigger. Thus, the instruction by the administrator becomes unnecessary. With Embodiment 4, the state change of the detection signal is used as the trigger, and the system firmware automatically controls the fibre channel controller 22 of the fibre channel card 20. The system firmware automatically executes the boot code or a driver to store the parameter data of the ROM 21 and restore the parameter data.

Further, with Embodiment 4, the system firmware automatically checks the state of the stored data in the ROM 21 and the SFP ROM module 32, and carries out the data writing to or reading from the SFP ROM module 32. For that purpose, with Embodiment 4, the boot code or the driver is automatically triggered to check the data stored in the ROM 21 and the SFP ROM module 32 upon detection of the state change of the detection signal.

As described, with Embodiment 4, when the administrator exchanges the SFP ROM module 32, the system firmware carries out the following operations. Said differently, the parameter data for the SAN boot are automatically recovered so as to be stored in the ROM 21 after backing up the parameter data and replacing the fibre channel card 20. Therefore, it becomes unnecessary for the administrator to confirm structural information or input the parameter data in replacing the fibre channel card 20. Therefore, work time for this can be shortened. By storing the parameter data of the fibre channel card 20 installed in the server 10 in the SFP ROM module 32, the setup information is accurately stored even if the fibre channel card fails, thereby avoiding an operational mistake.

As described above, with Embodiment 4, the bus 25 for the detection signal which is used to check the installation and uninstallation of the optical module runs between the fibre channel controller 22 and the SFP ROM module 32. By using the state change of the detection signal as the trigger, the operation by the administrator becomes unnecessary, and the system firmware automatically controls the fibre channel controller 22 of the fibre channel card 20. The system firmware instructs the boot code and driver to store and restore the parameter data in the ROM 21 of the fibre channel card. In order to check the installation and uninstallation of the SFP optical module 31 or the SFP ROM module 32 in or from the fibre channel card, a checking function using the voltage level of the detection signal is used. This checking function is provided in the fibre channel controller 22.

Although Embodiments 1 to 4 are described as individual embodiments, it is possible to provide a single embodiment having all the structures, functions and effects of Embodiments 1 to 4. Alternatively, it is possible to provide an embodiment having the structures, functions and effects of any plural embodiments of Embodiments 1 to 4. Said differently, in one of the embodiments, plural locations of external portions may be selected for storing the parameter data stored in the ROM 21 of the fibre channel card 20. The plural external locations may be the built-in ROM 32a of the SFP ROM module 32 in Embodiment 1, the SVP 50 of the server 10 in Embodiment 2, and the built-in ROM 31a of the SFP optical module 31 in Embodiment 3. Further, the structure of Embodiment 4 may be further combined with Embodiment 1, Embodiments 3, and a combined embodiment assembling Embodiments 1 and 3. The structure of Embodiment 4 enables automatically starting to store and restore the parameter data by detecting a state of inserting and not inserting the SFP optical module 31 or the SFP ROM module 32 by using the bus 25 for the detection signal.

Next, Embodiment 5 is described with reference to FIG. 20 to FIG. 28.

Figure 20:
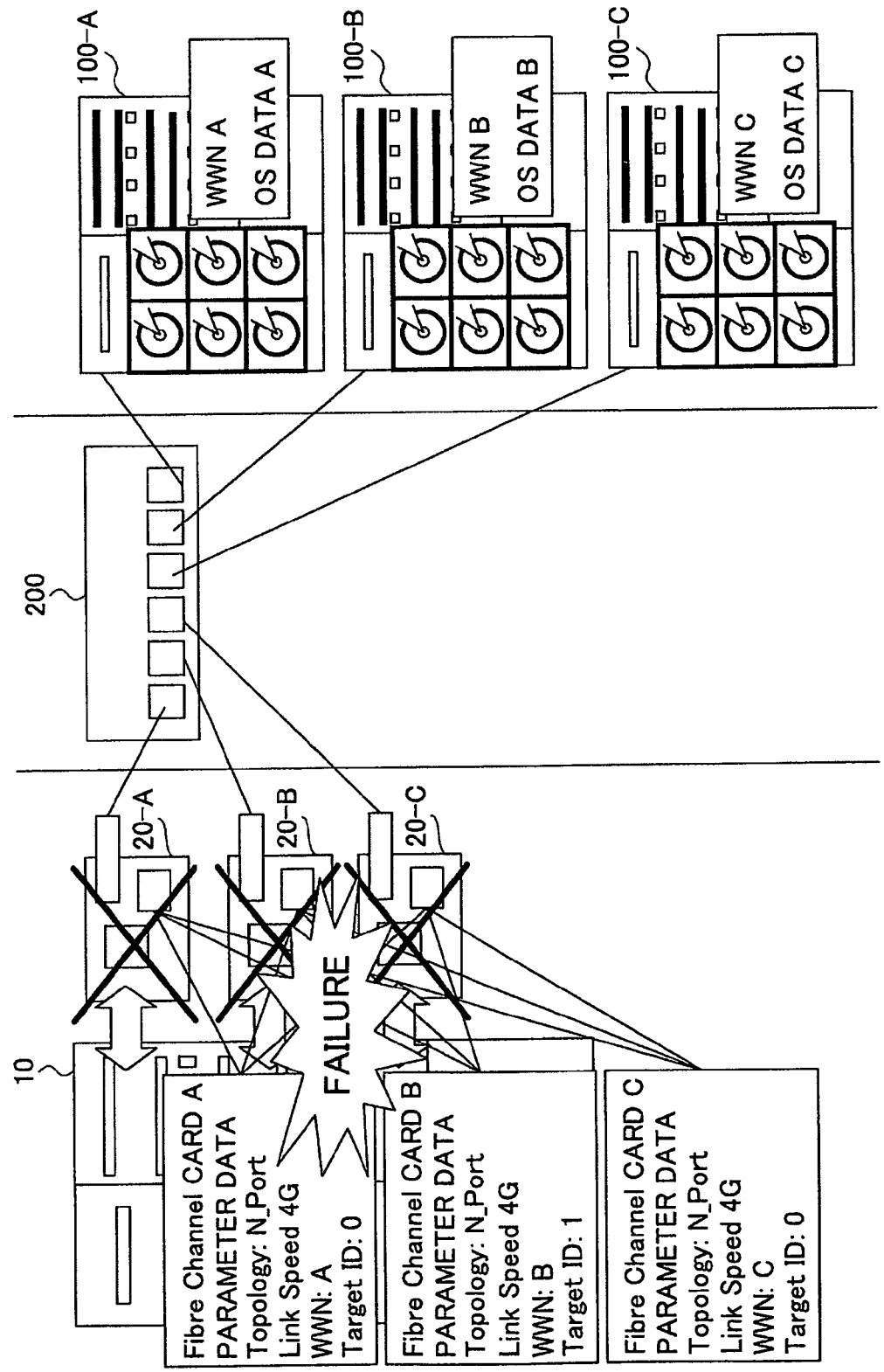
FIG. 20 is a first block chart for illustrating a function and effect of the fibre channel card of Embodiment 5.
Figure 21:
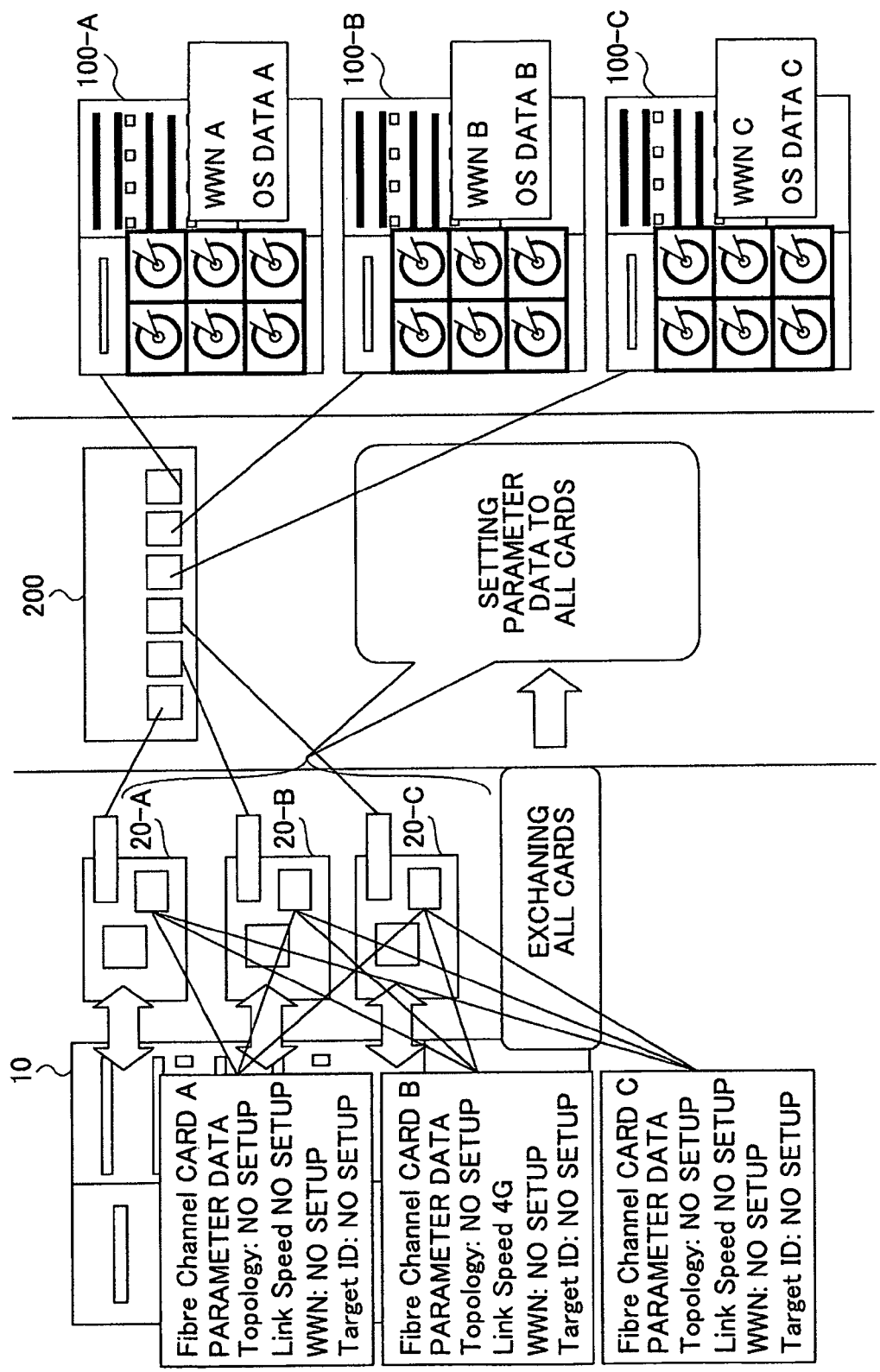
FIG. 21 is a second block chart for illustrating a function and effect of the fibre channel card of Embodiment 5.

With Embodiment 5, plural fibre channel cards 20-A, 20-B and 20-C are connected to the plural RAID apparatuses 100-A, 100-B and 100-C as illustrated in FIG. 20 and FIG. 21. Each element, i.e. the server 10, the fibre channel cards 20-A, 20-B and 20-C, the optical module, or the like have structures similar to those of the server 10, the fibre channel card 20, the optical module 31, or the like of any one of Embodiments 1 to 4. Therefore, different portions are mainly described.

Referring to Embodiment 5, the designation of the fibre channel cards 20-A, 20-B, and 20-C are changed depending on time slots, and different OSs are allocated to and switched for each of the fibre channel cards 20-A, 20-B, and 20-C. Therefore, the parameter data which are setup information for the SAN boot are set for each of the fibre channel cards 20-A, 20-B and 20-C.

With the information processing system having this structure, the parameter data for all fibre channel cards installed in the server 10 are written in each of the fibre channel cards. Consequently, by an operation of storing and restoring the parameter data in one of the fibre channel cards, the parameter data in all other fiber channel cards may be stored and restored. As described, with Embodiment 5, an operation of storing the parameter data which are stored in the plural fibre channel cards and for the SAN boot is facilitated, thereby the information is easily inherited when the fibre channel card fails.

FIG. 20 illustrates a case where all fibre channel cards 20-A, 20-B and 20-C installed in the server 10 fail. In this case, all fibre channel cards 20-A, 20-B and 20-C are exchanged. As described above, a case where different parameter data which are setup information for the SA boot are stored in the corresponding fibre channel cards 20-A, 20-B and 20-C is exemplified. Referring to FIG. 20 and FIG. 21, the number of the fibre channel cards is three and therefore three types of the parameter data exist. Referring to Embodiment 5, the three types of parameter data corresponding to the fibre channel cards 20-A, 20-B and 20-C are written in the fibre channels. For example, the three types of parameter data corresponding to the fibre channel cards 20-A, 20-B and 20-C are written in the fibre channel card 20-A. In a similar manner, the three types of parameter data corresponding to the fibre channel cards 20-A, 20-B and 20-C are written in the fibre channel card 20-B. In a similar manner, the three types of parameter data corresponding to the fibre channel cards 20-A, 20-B and 20-C are written in the fibre channel card 20-C.

Figure 22:
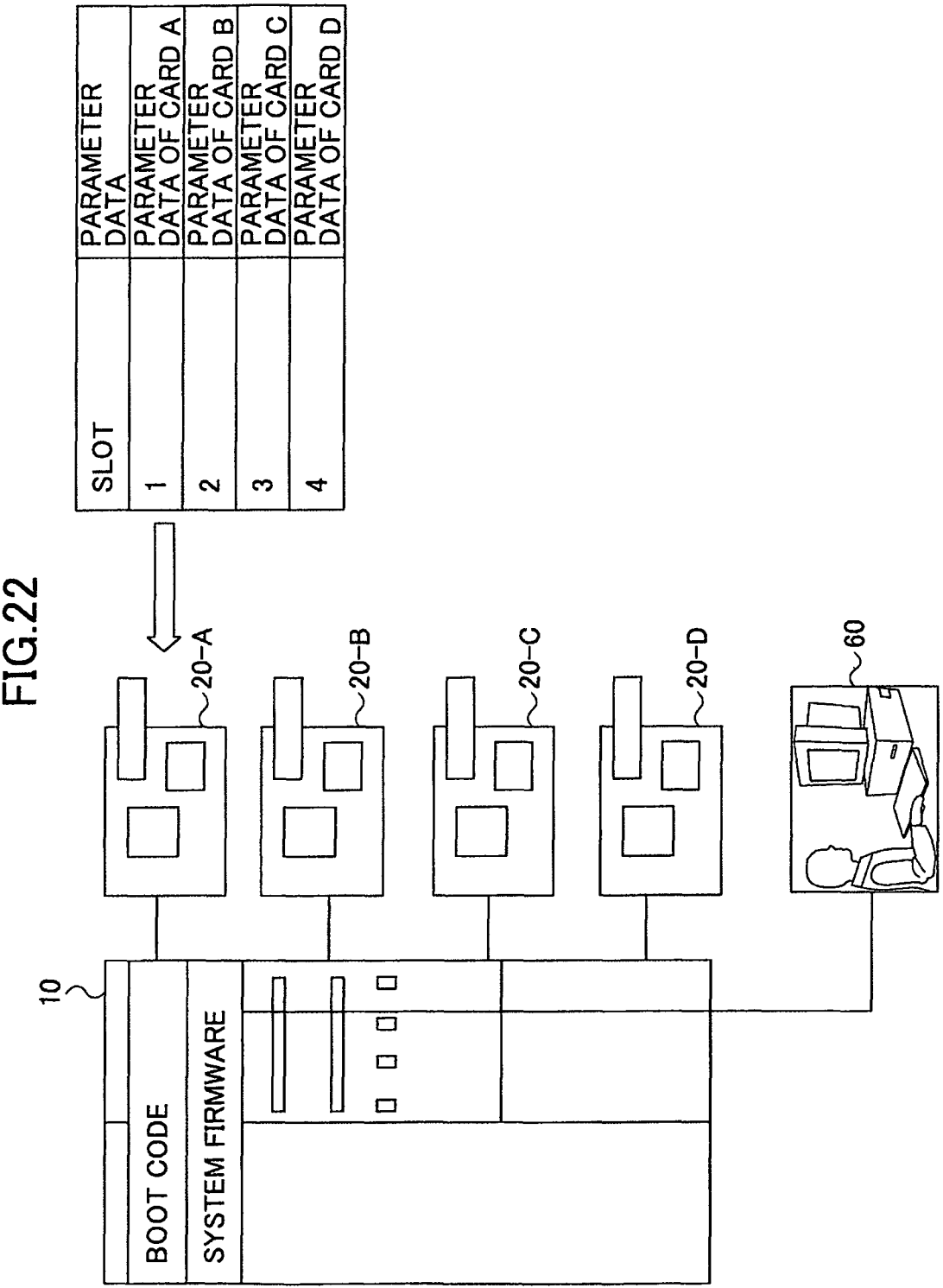
FIG. 22 is a third block chart for illustrating a function and effect of the fibre channel card of Embodiment 5.

With Embodiment 5, as illustrated in FIG. 22, system firmware carries out the following operations after starting up the system firmware. Said differently, all of the parameter data individually stored in each fibre channel card are written in a predetermined one of the fibre channel cards. Referring to FIG. 22, the fibre channel card 20-A originally stores only the own parameter data. In a similar manner, the fibre channel card 20-B originally stores only the own parameter data. In a similar manner, the fibre channel card 20-C originally stores only the own parameter data. In a similar manner, the fibre channel card 20-D originally stores only the own parameter data. Thereafter, the four types of the parameter data are written in one fibre channel card such as 20-A.

Figure 23:
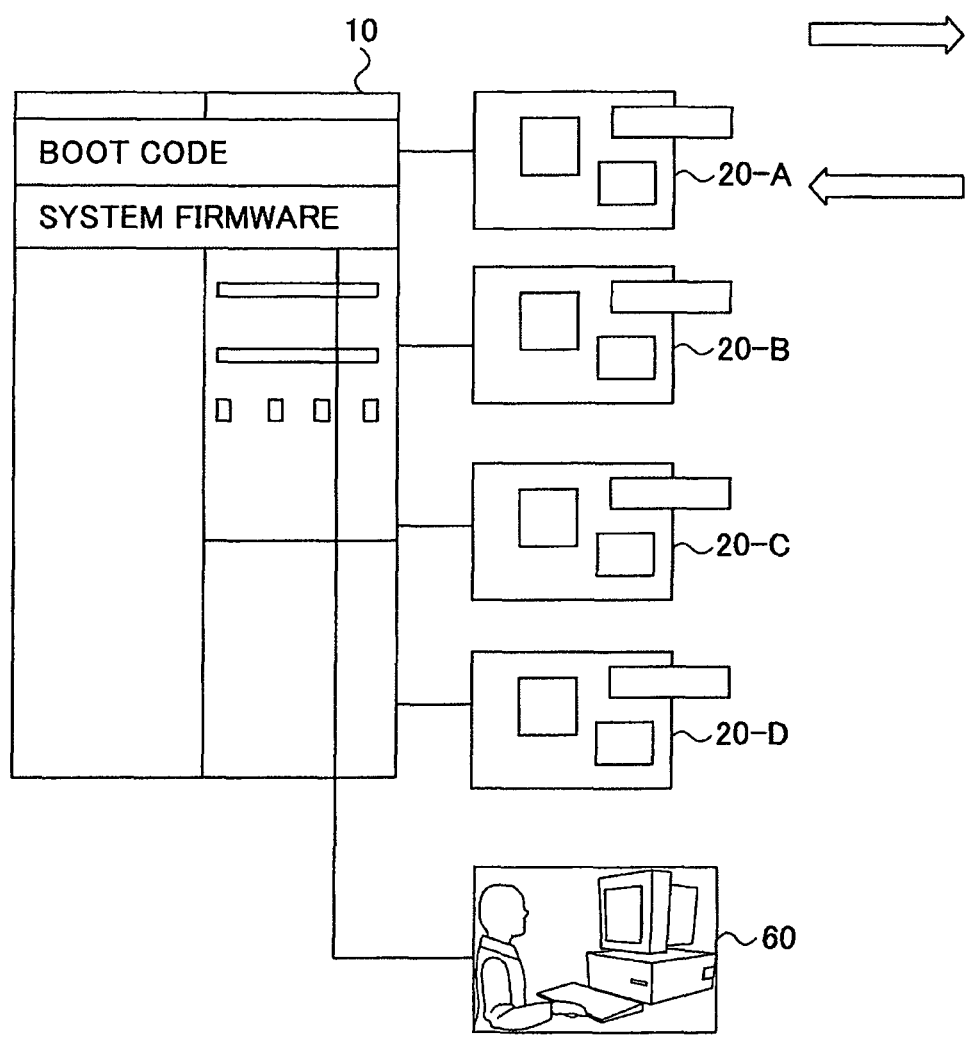
FIG. 23 is a fourth block chart for illustrating a function and effect of the fibre channel card of Embodiment 5.

Thereafter, as illustrated in FIG. 23, all types of the parameter data (four types in the above example) stored in the ROM 21 of the fibre channel card (20-A in the above example) are preserved in different places. This storing operation may be carried out by at least any one of the methods described in the above Embodiments 1 to 5. For example, with Embodiment 1, all kinds of the parameter data are separately stored in a built-in ROM 32a of the ROM module.

Figure 24:
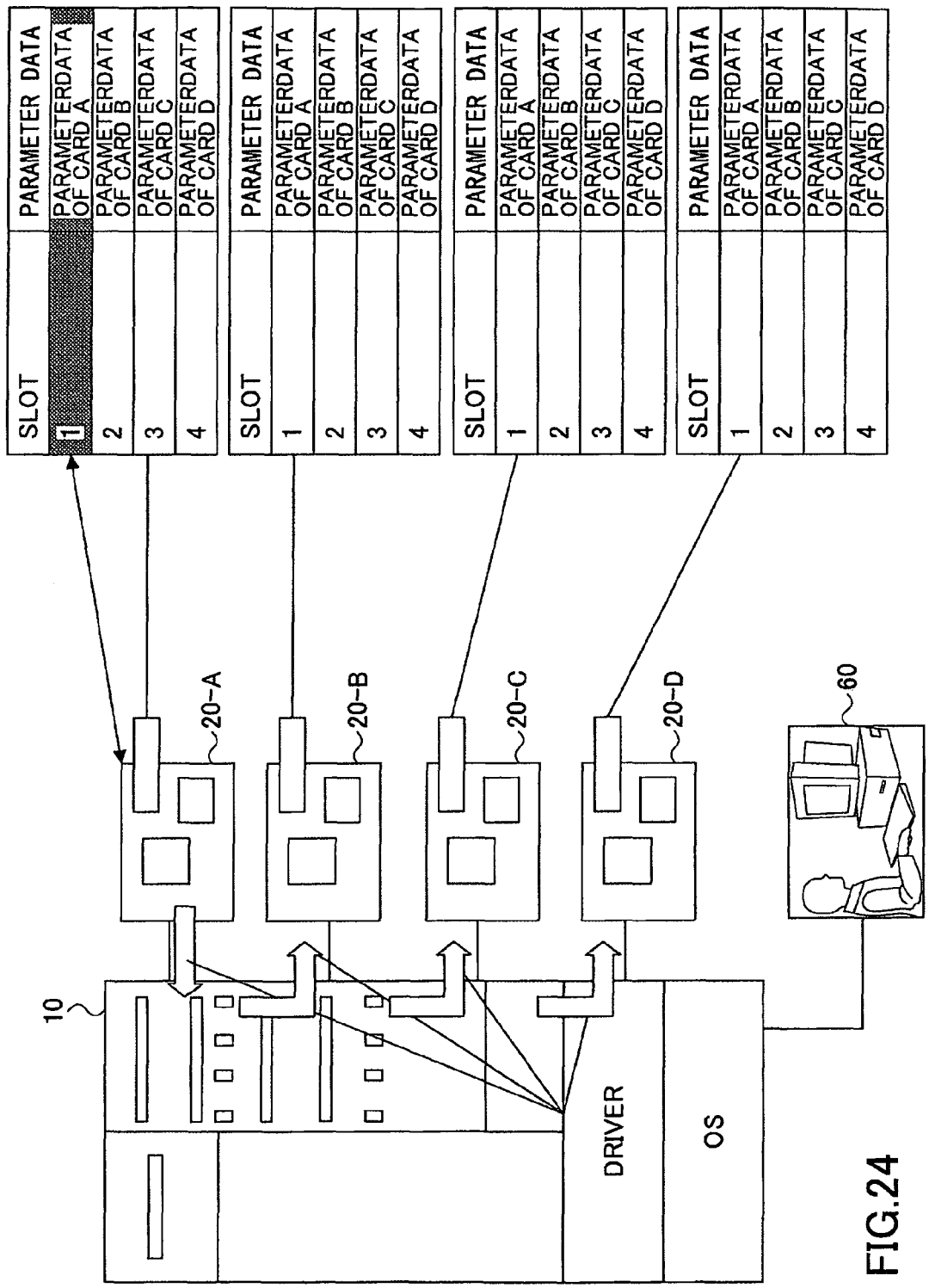
FIG. 24 is a fifth block chart for illustrating a function and effect of the fibre channel card of Embodiment 5.

After storing the parameter data, the system firmware invokes the OS from the fibre channel card in which all types of parameter data are set. After starting up the fibre channel card with the driver, all types of the parameter data are read from the ROM 21 of the fibre channel card. Thereafter, the all types of the parameter data are written in the ROM 21 of every fibre channel card. Referring to FIG. 23, the OS is booted up by the SAN boot using the fibre channel card 20-A. The invoked OS reads out four types of parameter data from the ROM 21 of the fibre channel card 20-A, and writes these parameter data in the ROM 21 of each of the other fibre channel cards 20-B, 20-C and 20-D. Consequently, as described above, all four types of the parameter data are stored in the ROM 21 of every fibre channel card 20-A, 20-B, 20-C and 20-D. All four types of parameter data are copied to all fibre channel cards. Thus, a state illustrated in FIG. 24 is established. For example, the four types of parameter data corresponding to the fibre channel cards 20-A, 20-B, 20-C and 20-D are written in the fibre channel card 20-A. In a similar manner, the four types of parameter data corresponding to the fibre channel cards 20-A, 20-B, 20-C and 20-D are written in the fibre channel card 20-B. In a similar manner, the four types of parameter data corresponding to the fibre channel cards 20-A, 20-B, 20-C and 20-D are written in the fibre channel card 20-C. In a similar manner, the four types of parameter data corresponding to the fibre channel cards 20-A, 20-B, 20-C and 20-D are written in the fibre channel card 20-D.

After completing the copy operation, the server is in an operational status. Thereafter, as described above, after replacing all failed fibre channel cards, the four types of parameter data are restored to a predetermined one fibre channel card with the method according to any one of Embodiments 1 to 4. Then, the OS is invoked by the fibre channel card in which the parameter data are restored. Thereafter, the parameter data of the fibre channel card started up by the driver are read and written in the other fibre channel cards. As described, the parameter data in the fibre channel cards installed in the server 10 are restored.

Figure 25:
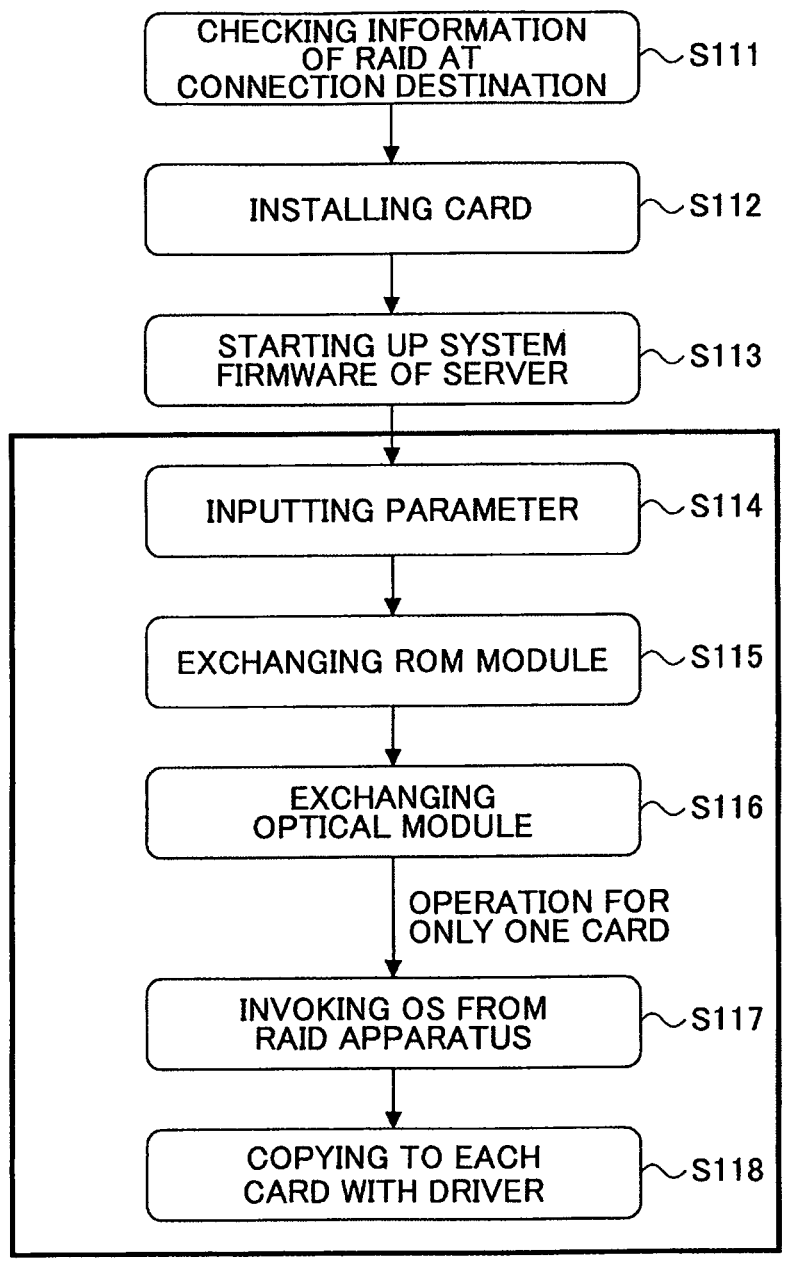
FIG. 25 is a first flow chart for illustrating a function and effect of the fibre channel card of Embodiment 5.
Figure 26:
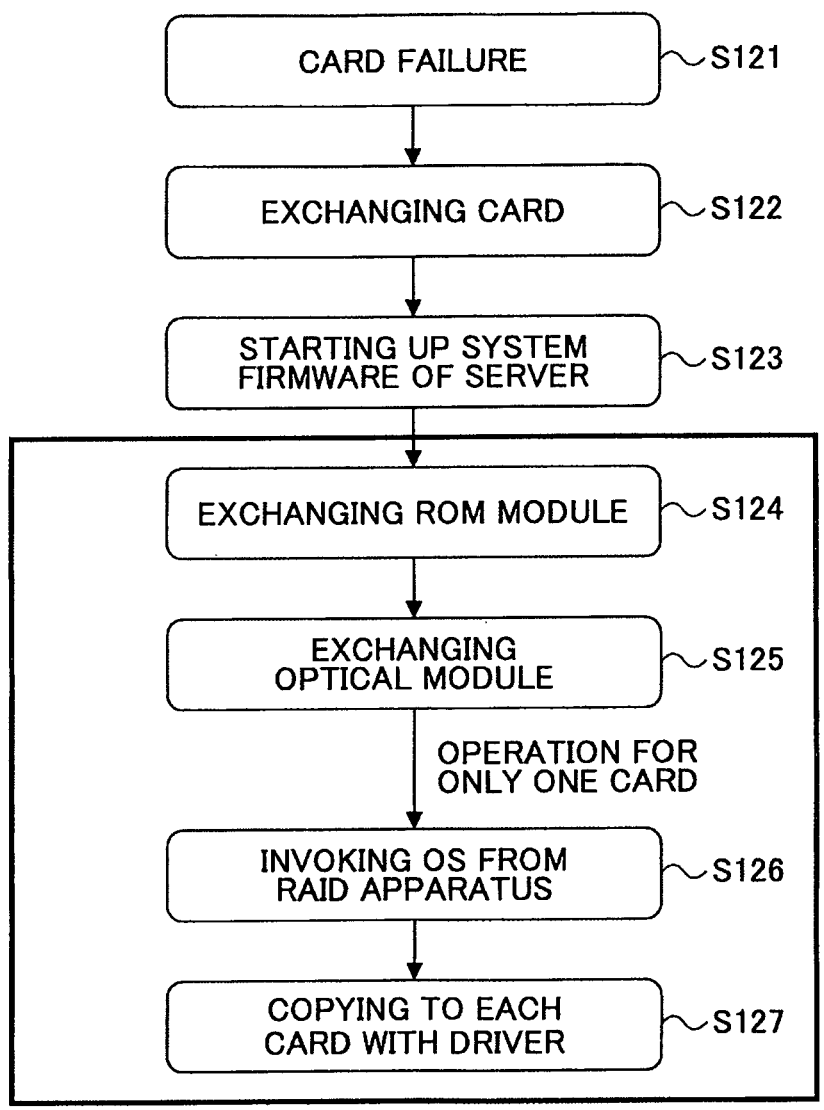
FIG. 26 is a second flow chart for illustrating a function and effect of the fibre channel card of Embodiment 5.

The operations of Embodiment 5 are further described in detail with reference to FIG. 25 and FIG. 26. Referring to FIG. 25 and FIG. 26, for convenience of the description, the method of Embodiment 1 is used to store and restore the parameter data.

First, a backup operation of the parameter data in the fibre channel card is described.

The administrator checks the RAID apparatus 100 to be connected by the server 10 (step S111 of FIG. 25). Thereafter, the administrator installs the fibre channel card 20 in the server (step S112). Then, the administrator uses an administrating terminal 60 to startup a system firmware (step S113). After starting up the system firmware, the administrator carries out by using an administrating terminal 60, an operation of setting the parameter data, which are setup information for the SAN boot in the RAID apparatus 100 to be connected to the fibre channel card 20, in the fibre channel card 20 (step S114).

Thereafter, the administrator writes slot information of the fibre channel cards and corresponding parameter data to the ROM 21 of a predetermined fibre channel card (20-A in a case of FIG. 23) which is installed on the server 10 from the administrating terminal 60 with the system firmware. The state is illustrated in FIG. 22. As illustrated in FIG. 23, the slot information of the fibre channel cards stored in the ROM 21 and the corresponding parameter information are stored in an external portion by using the method of any one of Embodiments 1 to 4. In case of using the method of Embodiment 1, the administrator exchanges one of the SFP optical modules 31 installed in the fibre channel card (20-A in case of FIG. 23) for the SFP ROM module 32 (step S115). Then, the slot information of the fibre channel cards and the corresponding parameter data are stored in the built-in ROM 32a of the ROM module 32. Thereafter, the ROM module 32 is exchanged for the SFP optical module 31 and the ROM module 32 is preserved (step S116).

As illustrated in FIG. 24, the administrator uses the system firmware to invoke the OS from the one fibre channel card (20-A in case of FIG. 23) with the administrating terminal 60. In this case, the boot code stored in the fibre channel card reads slot information indicative of the slot inside the server 10 in which the fibre channel card is installed from the server. The slot information is compared with the slot information stored in the ROM 21 of the fibre channel card. Thus, the slot information indicative of the slot in which the fibre channel card is installed is found. The parameter data corresponding to the slot information are used to invoke the OS with the SAN boot (step S117).

After invoking the OS, the administrator designates a driver by using the administrating terminal 60. The designated driver carries out the following operations using the ROM read command of the fibre channel controller in the fibre channel card (20-A in case of FIG. 23). As illustrated in FIG. 24, the designated driver sends the slot information and the corresponding parameter data stored in the ROM 21 of the fibre channel card (20-A in case of FIG. 23) to the server 10. Next, the designated driver uses the ROM write command of the fibre channel controllers 22 in the other fibre channel cards (20-B, 20-C and 20-D in case of FIG. 23), and writes the slot information and the corresponding parameter data to the ROM 21 of the other fibre channel cards (step S118).

After completing to write the slot information and the corresponding parameter data into the fibre channel cards, the server 10 is actually operated for service.

Next, a recovery operation of the parameter data after exchanging the fibre channel card is described next.

Referring to FIG. 26, when the fibre channel card 20 installed in the server 10 fails (step S121), the administrator exchanges all fibre channel cards for new fibre channel cards (step S122). Thereafter, the administrator operates the administrating terminal 60 to thereby start up the system firmware of the server (step S123).

Thereafter, the slot information and the corresponding parameter data are restored in the ROM 21 of one of the exchanged fibre channel cards which are installed in the server 10. In this, the method of any one of Embodiments 1 to 4 is used. For example, the slot information and the corresponding parameter data are read from the ROM module 32 in which the slot information and the corresponding parameter data are written, and written in the ROM 21 of the one of the fibre channel cards when the method of Embodiment 1 is used (step S124). This reading and writing operation is carried out when the SFP optical module 31 is exchanged by the stored SFP ROM module 32. After the reading and writing operation, the SFP ROM module 32 of the fibre channel card 20 is backed in place (step S125). With the reading and writing operation, the slot information and the corresponding parameter data are restored in the fibre channel card.

Thereafter, the administrator uses the system firmware with the administrating terminal 60, and invokes the OS from the fibre channel card (step S126). The administrator designates the fibre channel card, and the boot code of the fibre channel card reads the slot information of the slot in which the fibre channel card is installed from the server 10. By comparing the restored slot information, the slot in which the fibre channel card is installed is checked. The parameter data corresponding to the slot information are used to invoke the OS.

After invoking the OS, the administrator designates the driver by using the administrating terminal 60. The designated driver carries out the following operations using the ROM read command of the fibre channel controller 22 in the fibre channel card. As illustrated in FIG. 24, the designated driver sends the slot information and the corresponding parameter data stored in the ROM 21 to the server 10. Next, the designated driver uses the ROM write command of the fibre channel controllers 22 in the other fibre channel cards, and writes the slot information and the corresponding parameter data to the ROM 21 of the other fibre channel cards (step S127).

After completing to write the slot information and the corresponding parameter data into the fibre channel cards, the server 10 is actually operated for service.

With Embodiment 5, the parameter data of the plural fibre channel cards are stored in one fibre channel card. Consequently, with only an operation on the parameter data in the fibre channel card, the parameter data are preserved and restored in the plural fiber channel cards. With Embodiment 5, the parameter data which are setup information for the SAN boot of the fibre channel card can be preserved and restored with only the operation on the one fibre channel card. Consequently, it becomes unnecessary for the administrator to check structural information or manually input parameter data in exchanging the fibre channel card 20. Therefore, work time for this replacement can be shortened. Further, by preserving the parameter data in the fibre channel card installed in the server 10, the setup information can be accurately stored and the setup mistake is avoidable, even after the fibre channel card fails, by separately preserving the parameter data in the fiber channel card installed in the server.

Figure 27:
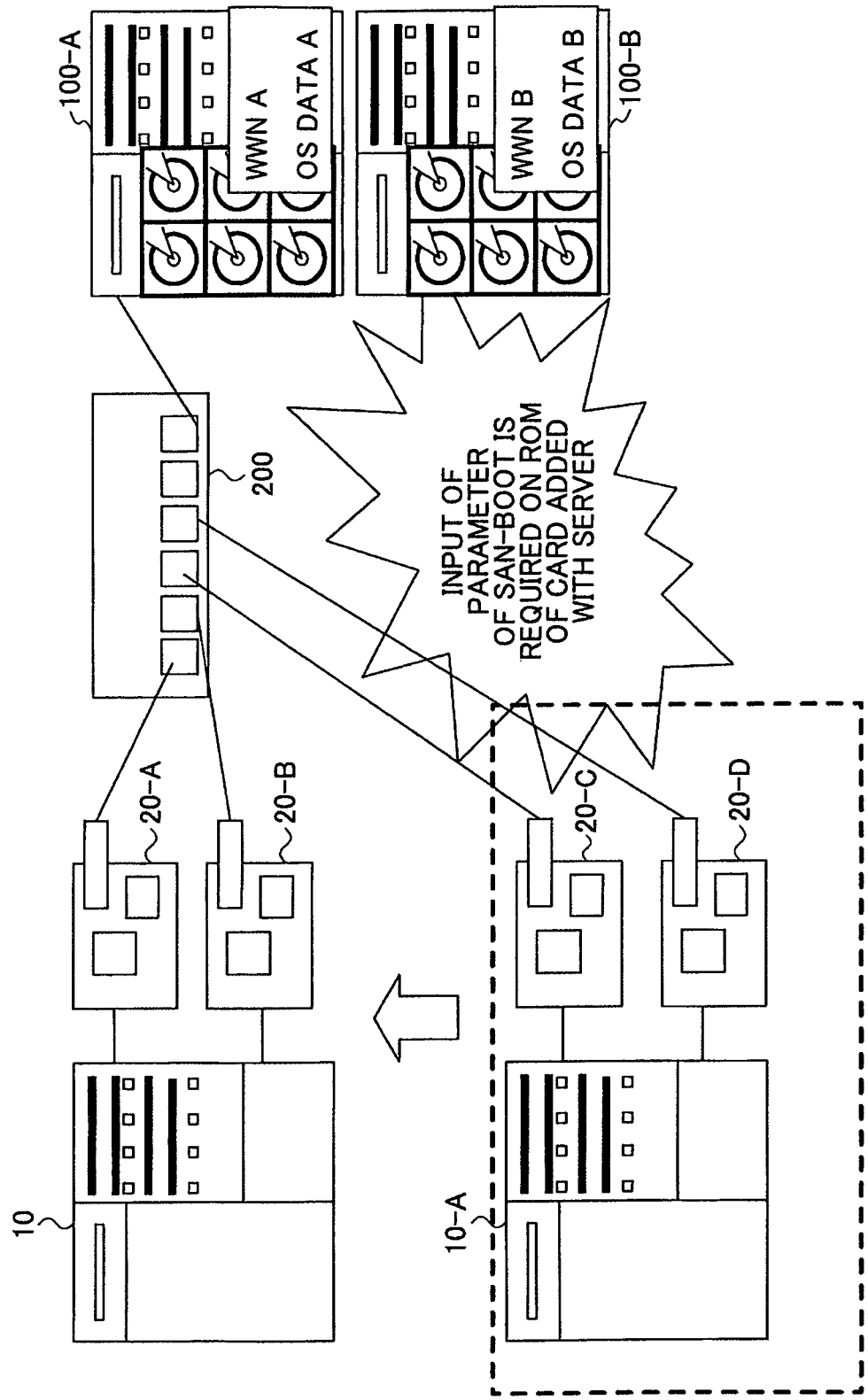
FIG. 27 is a sixth block chart for illustrating a function and effect of the fibre channel card of Embodiment 5.
Figure 28:
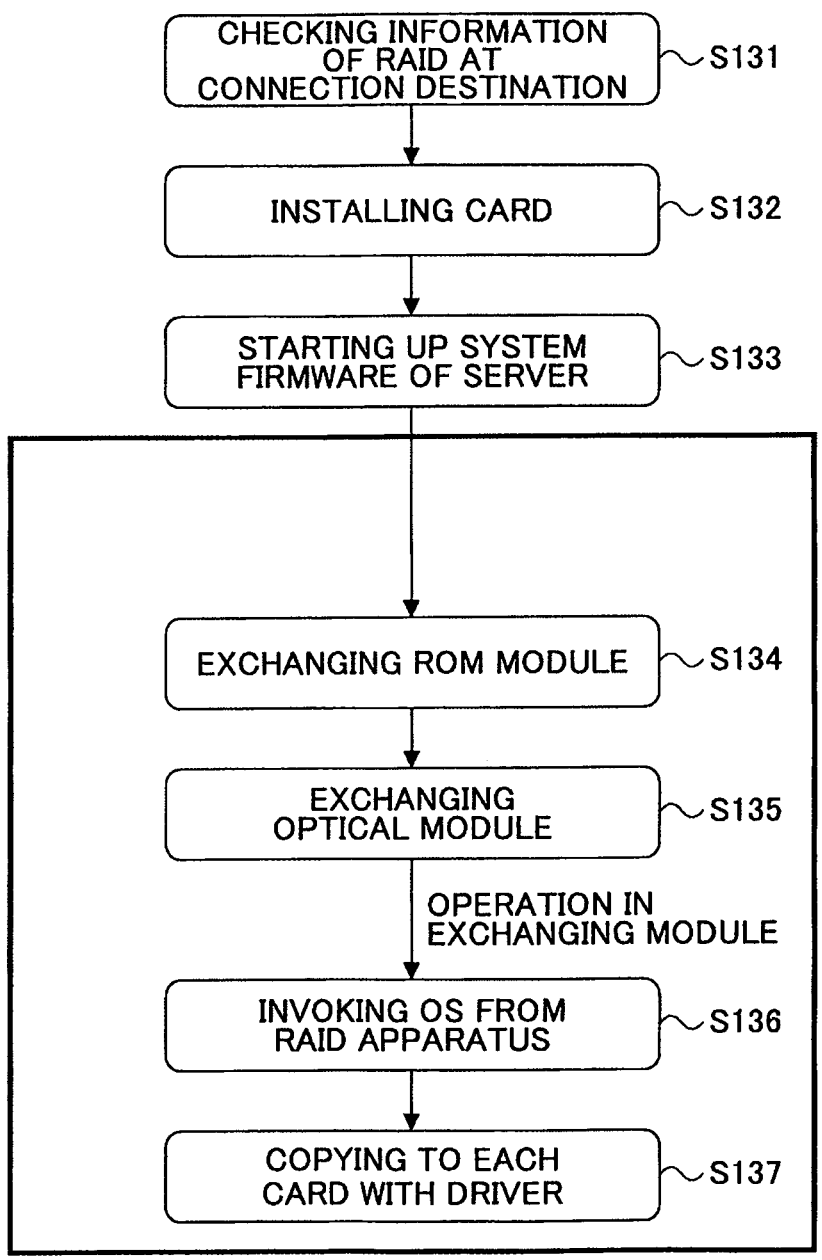
FIG. 28 is a third flow chart for illustrating a function and effect of the fibre channel card of Embodiment 5.

With Embodiment 5, it is possible to automatically copy the setup information without manually inputting the parameters when an identical system is additionally provided like a cluster. FIG. 27 and FIG. 28 illustrate this case.

Referring to FIG. 27, a server 10-A having a structure identical to that of the server 10 is additionally provided. Firstly, an administrator determines RAID apparatuses 100-A and 100-B to be connected by the server 10-A (step S131 of FIG. 28). Thereafter, the administrator installs fibre channel cards 20-C and 20-D in the server 10-A (step S132). Thereafter, the administrator uses an administrating terminal 60 to start up system firmware of the server 10-A (step S113). After starting up the system firmware, the administrator writes the slot information and the corresponding parameter data into the fibre channel card such as the ROM 21 of the fibre channel card 20-C installed in the server 10-A with the method of anyone of Embodiments 1 to 4. This writing operation is similar to the restoring operations of the Embodiments. For example, when the method of Embodiment 1 is used, the SFP optical module of the fibre channel card 20-C installed in the server 10-A is exchanged for the SFP ROM module 32 which has been preserved (step S134). The slot information and the corresponding parameter data stored in the ROM 21 of the fibre channel cards 20-A and 20-B which are installed in the server 10 are preserved as a backup in the built-in ROM 32a of the preserving ROM module 32. The preservation may be carried out by the above method described with reference to FIG. 25. Then, the slot information and the corresponding parameter data are read out from the built-in ROM 32a of the ROM module 32 and written in the ROM 21 of the fibre channel card 20-C installed in the server 10-A. Thereafter, the ROM module 32 of the fibre channel card 20-C is exchanged for the SFP optical module to be put back in place (step S135).

Thereafter, the administrator uses the system firmware with the administrating terminal 60, and invokes the OS from the fibre channel card 20-C (step S136). The administrator designates the fibre channel card 20-C, and the boot code of the fibre channel card 20-C reads the slot information of the slot in which the fibre channel card is installed from the server 10-A. Then, the slot information written in the ROM 21 of the fibre channel card 20-C included in the slot information and the corresponding parameter information is compared with the read slot information. With the operation of comparing the written slot information and the read slot information, the slot in which the fibre channel card is installed is checked. The parameter data corresponding to the slot information are used to invoke the OS.

After invoking the OS, the administrator designates the driver stored in the server 10-A by using the administrating terminal 60. The designated driver carries out the following operations using the ROM read command of the fibre channel controller 22 in the fibre channel card 20-C. Said differently, the designated driver sends the slot information and the corresponding parameter data stored in the ROM 21 of the fibre channel card 20-C to the server 10-A. Next, the designated driver uses the ROM write command of the fibre channel controller 22 in the other fibre channel card 20-D, and writes the read slot information and corresponding parameter data to the ROM 21 of the other fibre channel card 20-D (step S137).

After completing writing the slot information and the corresponding parameter data into the fibre channel card 20-D, the server 10-A is actually operated for service.

With Embodiment 5, the parameters of the fibre channel cards installed in the server are stored in one fibre channel card. Consequently, not only can operations of the one fibre channel card be performed, but also parameter data of all fibre channel cards installed in the server can be preserved and restored.

After the function expansion apparatus storing the setup information for connecting the information processing apparatus and the external storage apparatus is exchanged, it becomes possible to connect the information processing apparatus to the external storage apparatus via the first interface with the exchanged function expansion apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A function expansion apparatus for expanding a function of an information processing apparatus by connecting the information processing apparatus to an external storage apparatus via a first interface, the function expansion apparatus comprising:
a first storage unit that stores first setup information used for connecting the information processing apparatus to the external storage apparatus;
a connection module unit that is operated based on the first setup information and connects the information processing apparatus to the external storage apparatus via the first interface; and
a control unit that is connected to the first storage unit, and the connection module unit or a second storage unit, and stores second setup information stored in the second storage unit into the first storage unit,
wherein the second storage unit is exchangeable with the connection module unit and stores the second setup information in connecting to the connection module unit.

2. The function expansion apparatus according to claim 1, wherein the connection module unit is exchangeable with another connection module unit.

3. The function expansion apparatus according to claim 1, wherein an operating system for starting up the information processing apparatus is stored in the external storage apparatus.

4. The function expansion apparatus according to claim 1, wherein the connection module unit is connected to the control unit via a second interface being different from the first interface, and
the control unit stores the second setup information stored in the second storage unit into the first storage unit via the second interface.

5. The function expansion apparatus according to claim 1, wherein the first setup information and the second setup information include any one of information pieces of
a unique information piece that identifies the external storage apparatus via the first interface,
an identification information piece that identifies a drive device included in the external storage apparatus,
an information piece that indicates a connection mode of the first interface between the information processing apparatus and the external storage apparatus, and
a speed information piece of the first interface.

* * * * *